United States Patent
Andersson et al.

(10) Patent No.: US 10,080,038 B2
(45) Date of Patent: Sep. 18, 2018

(54) SPATIAL IMPROVEMENT OF TRANSFORM BLOCKS

(71) Applicant: Telefonaktiebolaget L M Ericsson (publ), Stockholm (SE)

(72) Inventors: Kenneth Andersson, Gävle (SE); Per Wennersten, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 358 days.

(21) Appl. No.: 14/779,262

(22) PCT Filed: Sep. 1, 2015

(86) PCT No.: PCT/SE2015/050919
§ 371 (c)(1),
(2) Date: Sep. 22, 2015

(87) PCT Pub. No.: WO2017/039501
PCT Pub. Date: Mar. 9, 2017

(65) Prior Publication Data
US 2017/0257644 A1 Sep. 7, 2017

(51) Int. Cl.
*H04N 19/61* (2014.01)
*H04N 19/122* (2014.01)
(Continued)

(52) U.S. Cl.
CPC .......... *H04N 19/61* (2014.11); *H04N 19/122* (2014.11); *H04N 19/176* (2014.11); *H04N 19/18* (2014.11); *H04N 19/86* (2014.11)

(58) Field of Classification Search
CPC ............................. H04N 19/61; H04N 19/122
See application file for complete search history.

(56) References Cited

U.S. PATENT DOCUMENTS

| 8,077,991 B2 | 12/2011 | Lainema |
| 2013/0034154 A1* | 2/2013 | Song .................. H04N 19/176 375/240.03 |

(Continued)

FOREIGN PATENT DOCUMENTS

| EP | 2464013 A1 | 6/2012 |
| WO | 2010116268 A1 | 10/2010 |

(Continued)

OTHER PUBLICATIONS

Liang, Hong et al., "A Cost Effective 2-D Adaptive Block Size IDCT Architecture for HEVC Standard", IEEE 56th International Midwest Symposium on Circuits and Systems (MWSCAS), Columbus, OH, Aug. 4-7, 2013, 1290-1293.

(Continued)

*Primary Examiner* — Tung Vo
*Assistant Examiner* — Rowina Cattungal
(74) *Attorney, Agent, or Firm* — Murphy, Bilak & Homiller, PLLC

(57) ABSTRACT

Reconstructed prediction errors in a sub-portion (12) of a residual block (11) obtained by inverse transforming a transform block (10) are modified in order to spatially improve localized portions of the residual block (11), e.g. to compensate for visual artifacts from transform coding. The modification affects reconstructed prediction errors in the sub-portion (12) of the residual block (11) but not reconstructed prediction errors in a remaining portion of the residual block (11).

45 Claims, 12 Drawing Sheets

(51) Int. Cl.
*H04N 19/176* (2014.01)
*H04N 19/18* (2014.01)
*H04N 19/86* (2014.01)

(56) References Cited

U.S. PATENT DOCUMENTS

| | | | |
|---|---|---|---|
| 2014/0003505 A1* | 1/2014 | Lainema | H04N 19/30 |
| | | | 375/240.12 |
| 2014/0198181 A1 | 7/2014 | Chen et al. | |
| 2014/0286413 A1* | 9/2014 | Joshi | H04N 19/70 |
| | | | 375/240.12 |
| 2015/0163498 A1 | 6/2015 | Shimada | |

FOREIGN PATENT DOCUMENTS

| | | |
|---|---|---|
| WO | 2014078068 A1 | 5/2014 |
| WO | 2014088772 A1 | 6/2014 |

OTHER PUBLICATIONS

Norkin, Andrey et al., "Two HEVC Encoder Methods for Block Artifact Reduction", 2013 Visual Communications and Image Processing (VCIP), Kuching, Nov. 17-29, 2013, 1-6.

* cited by examiner

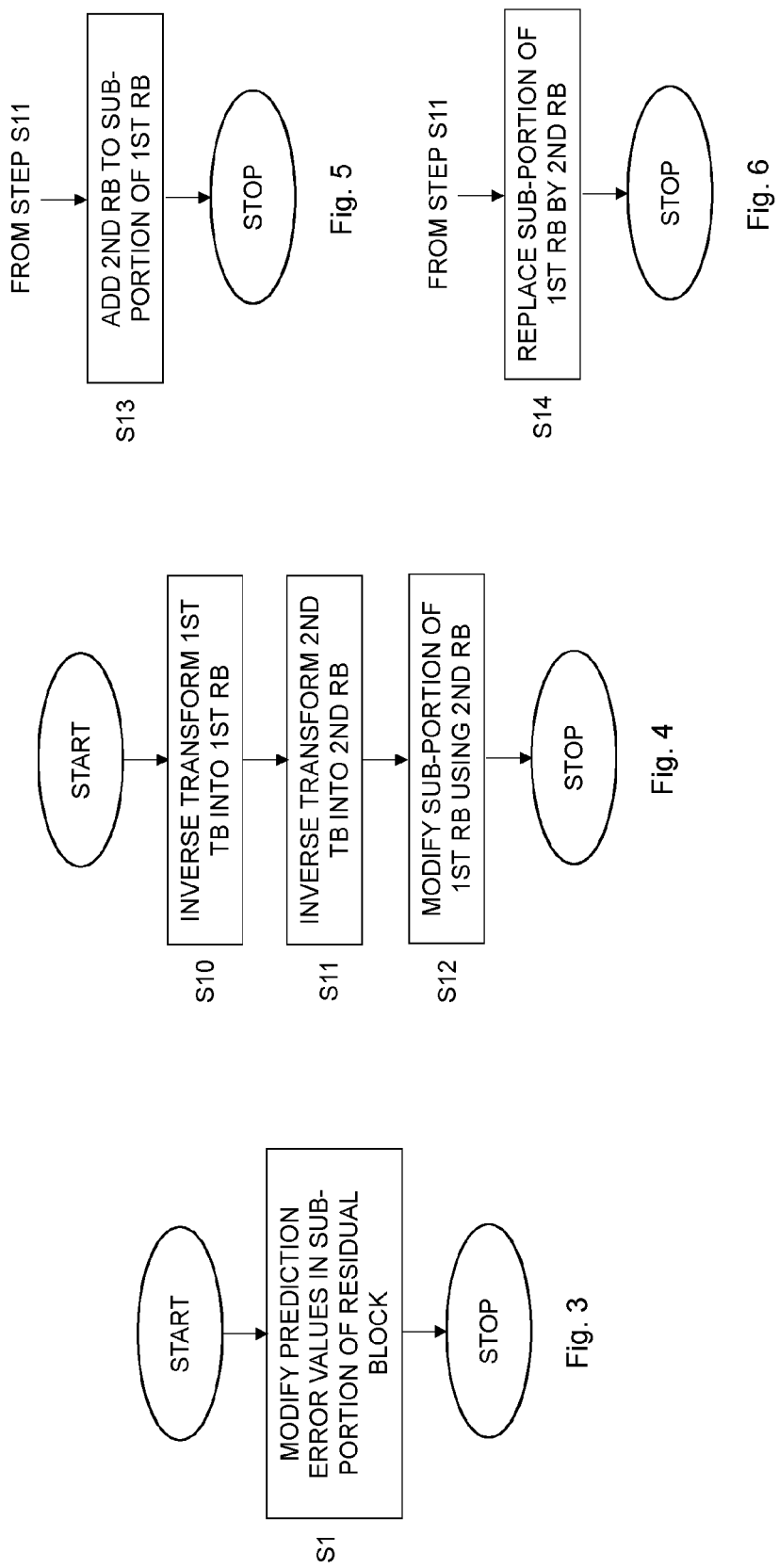

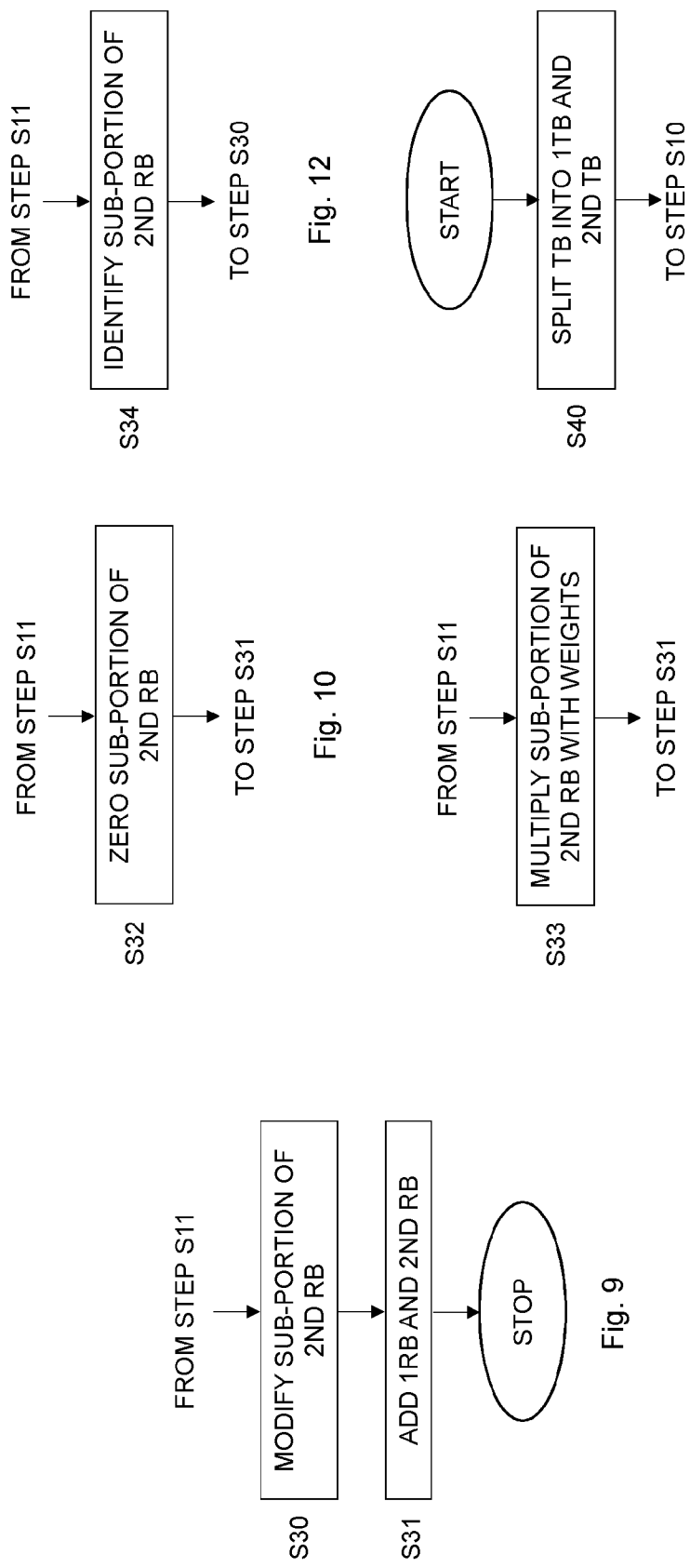

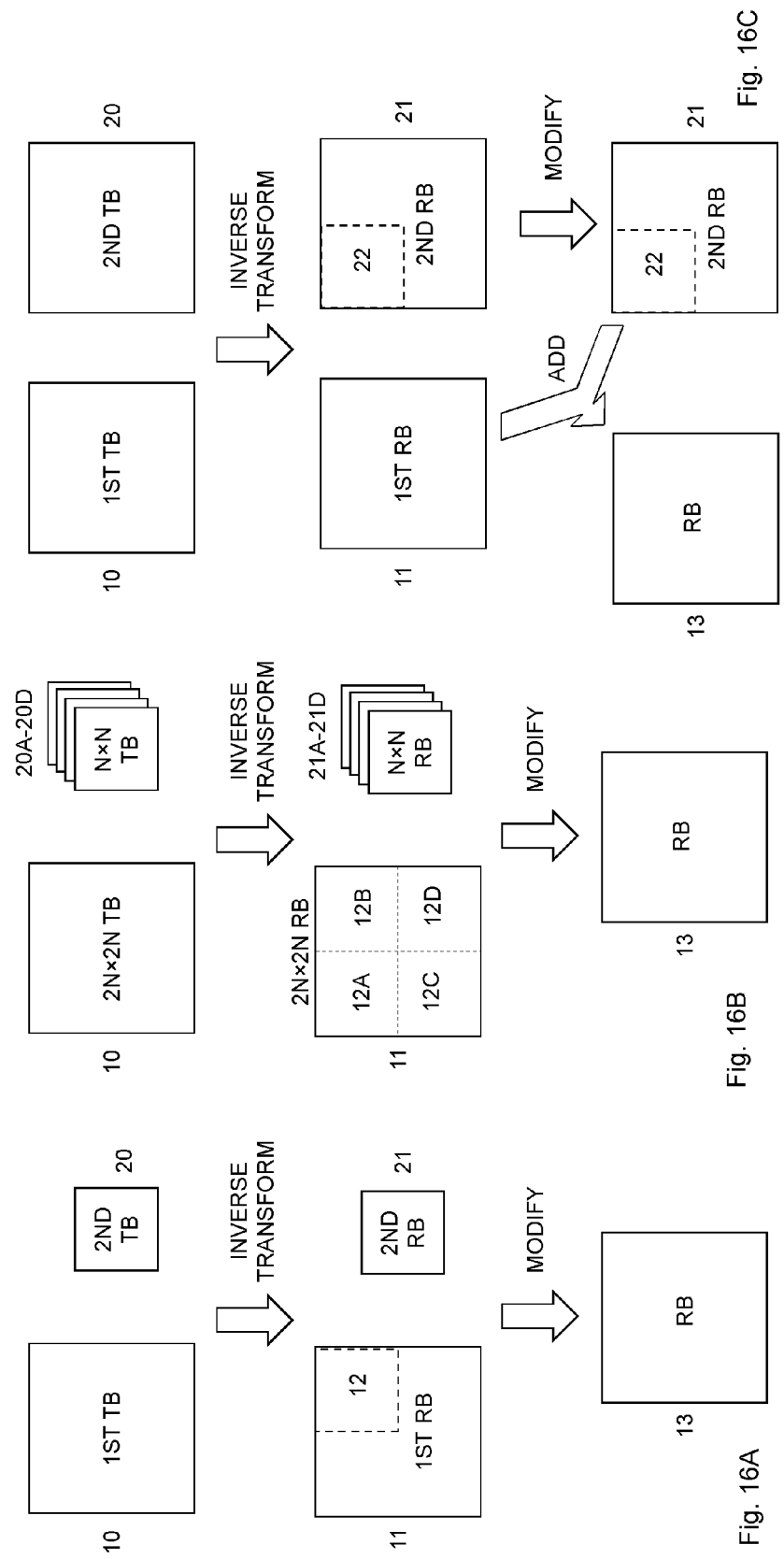

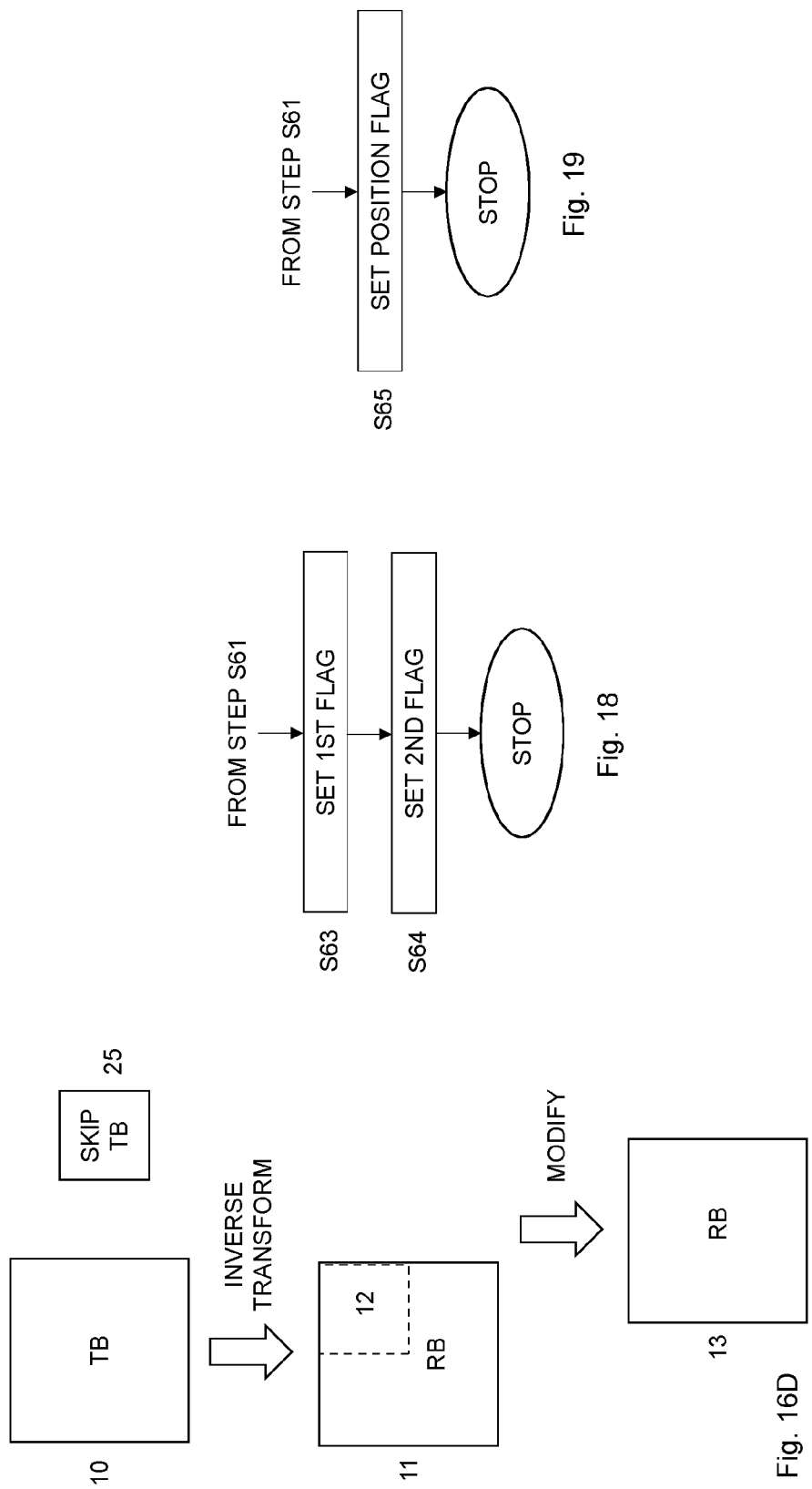

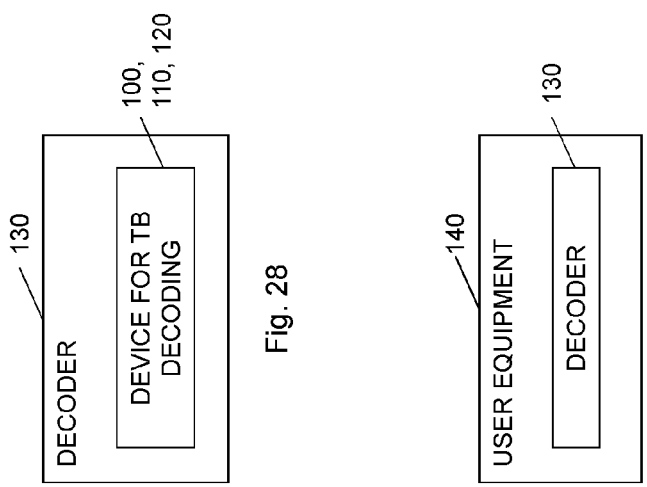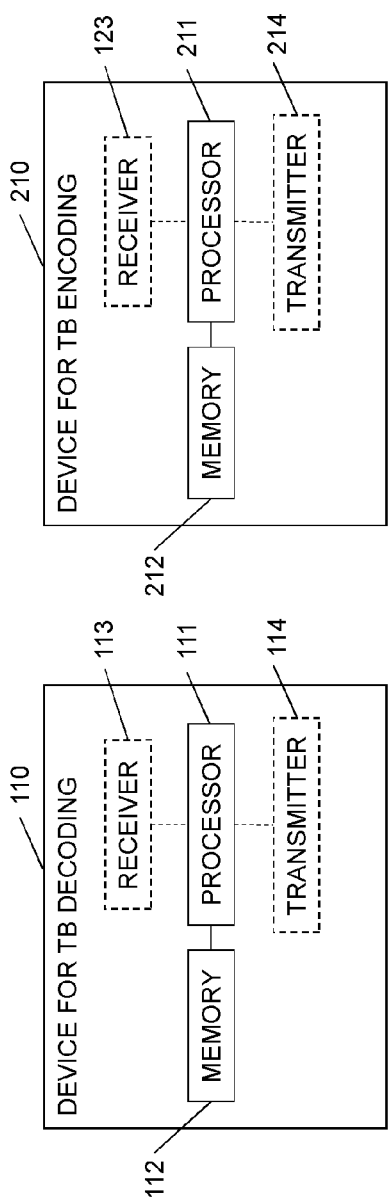

SPATIAL IMPROVEMENT OF TRANSFORM BLOCKS

TECHNICAL FIELD

The present embodiments generally relate to transform block decoding and encoding, and in particular to such decoding and encoding contributing to spatial improvement of transform blocks.

BACKGROUND

Transform coding within video coding has been shown to be very useful in removing redundancy in prediction errors. Such prediction errors come from predicting a current block of samples or pixels, typically denoted coding block (CB) or coding unit (CU) in the art, based on spatially neighboring previously coded samples (intra prediction) or based on temporally neighboring previously coded samples (inter prediction). In High Efficiency Video Coding (HEVC), also denoted H.265 in the art, the current block is divided into prediction blocks (PBs) or prediction units (PUs) of the same size as the current block or for a portion of the current block. A respective intra prediction mode or inter prediction is then selected for each such prediction block. A transform is applied in transform blocks (TBs) or transform units (TUs) on prediction errors with the same size as the current block (maximum TU size is 32×32 samples in HEVC) or for a portion of the prediction errors of the current block (minimum TU size is 4×4 samples in HEVC) to obtain transform coefficients. The transform coefficients are then quantized and entropy encoded, e.g. by Context Adaptive Binary Arithmetic Coding (CABAC) in HEVC. HEVC also support transform skip which means the prediction errors are coded without a transform.

A problem with transform coding is that it can produce visual artifacts in the form of transform basis patterns when strong quantization is used during the video coding, e.g. at challenging bitrates. This problem is illustrated in FIGS. 1A and 1B. FIG. 1A illustrates a residual block of samples having a respective prediction error value before applying transformation and quantization. FIG. 1B illustrates a reconstructed version of the residual block in FIG. 1A obtained by transforming and then quantizing the residual block followed by dequantization and then inverse transformation. Artifacts known as "ringing" are clearly seen in the top part of FIG. 1B.

In the current video coding standards, all frequencies in a residual block are coded at the same block size. In practice, a large area in a picture or frame of a video stream might contain smooth gradients as well as local high frequency parts. An encoder then has to choose whether to select small transform block sizes and risk having to encode the smooth gradient many times or select a large transform block size and still try to encode the local high frequencies. The former case leads to inefficient coding, whereas the latter case leads to ringing artifacts as shown in FIG. 1B.

As an alternative the encoder can select to not use the transform and code the prediction errors of the residual block without any transformation. However, the efficiency of such an approach is relatively bad for natural video content which typically contain spatial correlation between samples.

U.S. Pat. No. 8,077,991 discloses a technique combining the energy compaction features of transform coding with the localization properties of spatial coding. In more detail, transform coding is performed to the prediction errors of a residual block to create a first representation of the prediction errors. Spatial coding is performed to the prediction errors to create a second representation of the prediction errors. The two representations are joined to form a coded prediction error signal.

There is therefore a need for improvements within transform block decoding and encoding.

SUMMARY

It is a general objective to improve transform block decoding and encoding.

It is a particular objective to provide a technology that can compensate for artifacts in form of transform basis patterns.

These and other objectives are met by embodiments as disclosed herein.

An aspect of the embodiments relates to a method of transform block decoding. The method comprises inverse transforming a first transform block of samples having a respective transform coefficient to obtain a first residual block of samples having a respective reconstructed prediction error value. The method also comprises inverse transforming a second transform block of samples having a respective transform coefficient to obtain a second residual block of samples having a respective reconstructed prediction error value. The method further comprises modifying respective reconstructed prediction error values of samples in a sub-portion of the first residual block by respective reconstructed prediction error values of the second residual block. The modification affects reconstructed prediction error values of samples in the sub-portion of the first residual block but not reconstructed prediction error values of samples in a remaining portion of the first residual block.

A related aspect of the embodiments defines a method of transform block decoding. The method comprises inverse transforming a transform block of samples having a respective transform coefficient to obtain a residual block of samples having a respective reconstructed prediction error value. The method also comprises providing a transform skip block of samples having a respective prediction error value. The transform skip block has a smaller size in terms of number of samples as compared to the residual block. The method further comprises modifying, sample by sample, respective reconstructed prediction error values of samples in a sub-portion of the residual block by respective prediction error values of the transform skip block. The modification affects reconstructed prediction error values of samples in the sub-portion of the residual block but not reconstructed prediction error values of samples in a remaining portion of the residual block.

Another aspect of the embodiments relates to a method of transform block encoding. The method comprises transforming a first residual block of samples having a respective prediction error value into a first transform block of samples having a respective transform coefficient. The method also comprises inverse transforming a second residual block of samples having a respective prediction error value into a second transform block of samples having a respective transform coefficient. The method further comprises providing information instructing a decoder to modify respective reconstructed prediction error values in a sub-portion of a reconstructed version of the first residual block obtained based on the first transform block by respective reconstructed prediction error values of a reconstructed version of the second residual block obtained based on the second transform block. The modification performed based on the provided information affects reconstructed prediction error values of samples in the sub-portion of the reconstructed version of the first residual block but not reconstructed prediction error values of samples in a remaining portion of the reconstructed version of the first residual block.

A related aspect of the embodiments defines a method of transform block encoding. The method comprises transforming a residual block of samples having a respective prediction error value into a transform block of samples having a respective transform coefficient. The method also comprises providing a transform skip block of samples having a respective prediction error value. The transform skip block has a smaller size in terms of number of samples as compared to the residual block. The method further comprises providing information instructing a decoder to modify, sample by sample, respective reconstructed prediction error values in a sub-portion of a reconstructed version of the residual block obtained based on the transform block by respective prediction error values of the transform skip block. The modification performed based on the provided information affects reconstructed prediction error values of samples in the sub-portion of the reconstructed version of the residual block but not reconstructed prediction error values of samples in a remaining portion of the reconstructed version of the residual block.

A further aspect of the embodiments relates to a device for transform block decoding. The device is configured to inverse transform a first transform block of samples having a respective transform coefficient to obtain a first residual block of samples having a respective reconstructed prediction error value. The device is also configured to inverse transform a second transform block of samples having a respective transform coefficient to obtain a second residual block of samples having a respective reconstructed prediction error value. The device is further configured to modify respective reconstructed prediction error values of samples in a sub-portion of the first residual block by respective reconstructed prediction error values of the second residual block. The modification performed by the device affects reconstructed prediction error values of samples in the sub-portion of the first residual block but not reconstructed prediction error values of samples in a remaining portion of the first residual block.

A related aspect of the embodiments defines a device for transform block decoding. The device is configured to inverse transform a transform block of samples having a respective transform coefficient to obtain a residual block of samples having a respective reconstructed prediction error value. The device is also configured to provide a transform skip block of samples having a respective prediction error value. The transform skip block has a smaller size in terms of number of samples as compared to the residual block. The device is further configured to modify, sample by sample, respective reconstructed prediction error values of samples in a sub-portion of the residual block by respective prediction error values of the transform skip block. The modification performed by the device affects reconstructed prediction error values of samples in the sub-portion of the residual block but not reconstructed prediction error values of samples in a remaining portion of the residual block.

Another related aspect of the embodiments defines a device for transform block decoding. The device comprises an inverse transforming unit for inverse transforming a first transform block of samples having a respective transform coefficient to obtain a first residual block of samples having a respective reconstructed prediction error value and inverse transforming a second transform block of samples having a respective transform coefficient to obtain a second residual block of samples having a respective reconstructed prediction error value. The device also comprises a modifying unit for modifying respective reconstructed prediction error values of samples in a sub-portion of the first residual block by respective reconstructed prediction error values of the second residual block. The modification performed by the modifying unit affects reconstructed prediction error values of samples in the sub-portion of the first residual block but not reconstructed prediction error values of samples in a remaining portion of the first residual block.

A further related aspect of the embodiments defines a device for transform block decoding. The device comprises an inverse transforming unit for inverse transforming a transform block of samples having a respective transform coefficient to obtain a residual block of samples having a respective reconstructed prediction error value. The device also comprises a modifying unit for modifying, sample by sample, respective reconstructed prediction error values in a sub-portion of the residual block by respective prediction error values of a transform skip block of samples having a respective prediction error value. The transform skip block has a smaller size in terms of number of samples as compared to the residual block. The modification performed by the modifying unit affects reconstructed prediction error values of samples in the sub-portion of the residual block but not reconstructed prediction error values of samples in a remaining portion of the residual block.

Yet another aspect of the embodiments relates to a device for transform block encoding. The device is configured to transform a first residual block of samples having a respective prediction error value into a first transform block of samples having a respective transform coefficient. The device is also configured to transform a second residual block of samples having a respective prediction error value into a second transform block of samples having a respective transform coefficient. The device is further configured to provide information instructing a decoder to modify respective reconstructed prediction error values of samples in a sub-portion of a reconstructed version of the first residual block obtained based on the first transform block by respective reconstructed prediction error values of a reconstructed version of the second residual block obtained based on the second transform block. The modification affects reconstructed prediction error values of samples in the sub-portion of the reconstructed version of the first residual block but not reconstructed prediction error values of samples in a remaining portion of the reconstructed version of the first residual block.

A related aspect of the embodiments defines a device for transform block encoding. The device is configured to transform a residual block of samples having a respective prediction error value into a transform block of samples having a respective transform coefficient. The device is also configured to provide a transform skip block of samples having a respective prediction error value. The transform skip block has a smaller size in terms of number of samples as compared to the residual block. The device is further configured to provide information instructing a decoder to modify, sample by sample, respective reconstructed prediction error values in a sub-portion of a reconstructed version of the residual block obtained based on the transform block by respective prediction error values of the transform skip block. The modification performed based on the provided information affects reconstructed prediction error values of samples in the sub-portion of the reconstructed version of the residual block but not reconstructed prediction error values of samples in a remaining portion of the reconstructed version of the residual block.

Another related aspect of the embodiments defines a device or transform block encoding. The device comprises a transforming unit for transforming a first residual block of samples having a respective prediction error value into a first transform block of samples having a respective transform coefficient and transforming a second residual block of samples having a respective prediction error value into a second transform block of samples having a respective transform coefficient. The device also comprises a providing unit for providing information instructing a decoder to modify respective reconstructed prediction error values of samples in a sub-portion of a reconstructed version of the first residual block obtained based on the first transform block by respective reconstructed prediction error values of a reconstructed version of the second residual block obtained based on the second transform block. The modification performed based on the provided information affects reconstructed prediction error values of samples in the sub-portion of the reconstructed version of the first residual block but not reconstructed prediction error values of samples in a remaining portion of the reconstructed version of the first residual block.

A further related aspect of the embodiments defines a device for transform block encoding. The device comprises a transforming unit for transforming a residual block of samples having a respective prediction error value into a transform block of samples having a respective transform coefficient. The device also comprises a providing unit for providing a transform skip block of samples having a respective prediction error value. The transform skip block has a smaller size in terms of number of samples as compared to the residual block. The providing unit is also for providing information instructing a decoder to modify, sample by sample, respective reconstructed prediction error values of samples in a sub-portion of a reconstructed version of the residual block obtained based on the transform block by the respective prediction error values of the transform skip block. The modification performed based on the provided information values affects reconstructed prediction error values of samples in the sub-portion of the reconstructed version of the residual block but not reconstructed prediction error values of samples in a remaining portion of the reconstructed version of the residual block.

A further aspect of the embodiments relates to a computer program comprising instructions, which when executed by a processor, cause the processor to inverse transform a first transform block of samples having a respective transform coefficient to obtain a first residual block of samples having a respective reconstructed prediction error value. The processor is also caused to inverse transform a second transform block of samples having a respective transform coefficient to obtain a second residual block of samples having a respective reconstructed prediction error value. The processor is further caused to modify respective reconstructed prediction error values of samples in a sub-portion of the first residual block by respective reconstructed prediction error values of the second residual block. The modification performed by the processor affects reconstructed prediction error values of samples in the sub-portion of the first residual block but not reconstructed prediction error values of samples in a remaining portion of the first residual block.

A related aspect of the embodiments defines a computer program comprising instructions, which when executed by a processor, cause the processor to inverse transform a transform block of samples having a respective transform coefficient to obtain a residual block of samples having a respective reconstructed prediction error value. The processor is also caused to provide a transform skip block of samples having a respective prediction error value. The transform skip block has a smaller size in terms of number of samples as compared to the residual block. The processor is further caused to modify, sample by sample, respective reconstructed prediction error values of samples in a sub-portion of the residual block by respective prediction error values of the transform skip block. The modification performed by the processor affects reconstructed prediction error values of samples in the sub-portion of the residual block but not reconstructed prediction error values of samples in a remaining portion of the residual block.

Yet another aspect of the embodiments relates to a computer program comprising instructions, which when executed by a processor, cause the processor to transform a first residual block of samples having a respective prediction error value into a first transform block of samples having a respective transform coefficient. The processor is also caused to transform a second residual block of samples having a respective prediction error value into a second transform block of samples having a respective transform coefficient. The processor is also caused to provide information instructing a decoder to modify respective reconstructed prediction error values of samples in a sub-portion of a reconstructed version of the first residual block obtained based on the first transform block by respective reconstructed prediction error values of a reconstructed version of the second residual block obtained based on the second transform block. The modification performed by the processor affects reconstructed prediction error values of samples in the sub-portion of the reconstructed version of the first residual block but not reconstructed prediction error values of samples in a remaining portion of the reconstructed version of the first residual block.

A related aspect of the embodiments defines a computer program comprising instructions, which when executed by a processor, cause the processor to transform a residual block of samples having a respective prediction error value into a transform block of samples having a respective transform coefficient. The processor is also caused to provide a transform skip block of samples having a respective prediction error value. The transform skip block has a smaller size in terms of number of samples as compared to the residual block. The processor is further caused to provide information instructing a decoder to modify, sample by sample, respective reconstructed prediction error values of samples in a sub-portion of a reconstructed version of the residual block obtained based on the transform block by respective prediction error values of the transform skip block. The modification performed by the processor affects reconstructed prediction error values of samples in the sub-portion of the reconstructed version of the residual block but not reconstructed prediction error values of samples in a remaining portion of the reconstructed version of the residual block.

Yet another aspect of the embodiments defines a carrier comprising a computer program as defined above. The carrier is one of an electronic signal, an optical signal, an electromagnetic signal, a magnetic signal, an electric signal, a radio signal, a microwave signal, or a computer-readable storage medium.

The embodiments achieve a spatially localized improvement in the reconstructed residual block prior to addition to the prediction. The localized spatial improvement can thereby compensate for or handle artifacts from transform coding, such as in the form of transform basis patterns. These artifacts would otherwise cause visually annoying effects in video frames or pictures of a video stream.

BRIEF DESCRIPTION OF THE DRAWINGS

The embodiments, together with further objects and advantages thereof, may best be understood by making reference to the following description taken together with the accompanying drawings, in which:

FIG. 3 is a flow chart illustrating a general concept of a method of transform block decoding according to an embodiment;

FIG. 4 is a flow chart illustrating a method of transform block decoding according to an embodiment;

FIG. 5 is a flow chart illustrating an embodiment of the modifying step in FIG. 4;

FIG. 6 is a flow chart illustrating another embodiment of the modifying step in FIG. 4;

FIG. 9 is a flow chart illustrating yet another embodiment of the modifying step in FIG. 4;

FIG. 10 is a flow chart illustrating an embodiment of the modifying step in FIG. 9;

FIG. 11 is a flow chart illustrating another embodiment of the modifying step in FIG. 9;

FIG. 12 is a flow chart illustrating an additional, optional step of the method shown in FIG. 9 according to an embodiment;

FIG. 13 is a flow chart illustrating an additional, optional step of the method shown in FIG. 9 according to another embodiment;

FIGS. 16A-16D schematically illustrate various examples of the transform block decoding;

FIG. 18 is a flow chart illustrating an embodiment of the providing step in FIG. 17;

FIG. 19 is a flow chart illustrating another embodiment of the providing step in FIG. 17;

FIG. 23 is a schematic block diagram of a device for transform block decoding according to another embodiment;

FIG. 24 is a schematic block diagram of a device for transform block encoding according to another embodiment;

FIG. 28 is a schematic block diagram of a decoder according to an embodiment;

FIG. 29 is a schematic block diagram of a user equipment according to an embodiment.

FIGS. 31 and 32 are diagrams of examples of modifying reconstructed prediction error values.

FIG. 33 is a diagram of an example splitting step.

DETAILED DESCRIPTION

Throughout the drawings, the same reference numbers are used for similar or corresponding elements.

The present embodiments generally relate to transform block decoding and encoding, and in particular to such decoding and encoding contributing to spatial improvement of transform blocks. The embodiments thereby achieve an improvement in spatially localized portions of a reconstructed residual block, also denoted decoded residual block in the art, before the reconstructed residual block is added to an intra or inter prediction to form a reconstructed (or decoded) version of an original block of samples or pixels. This improvement is achieved by modifying reconstructed (or decoded) prediction error values in a sub-portion of the reconstructed residual block prior to addition to the intra or inter prediction. This spatially localized modification can thereby compensate for artifacts introduced during transformation and quantization in connection with coding of the original block.

Figure 1B:
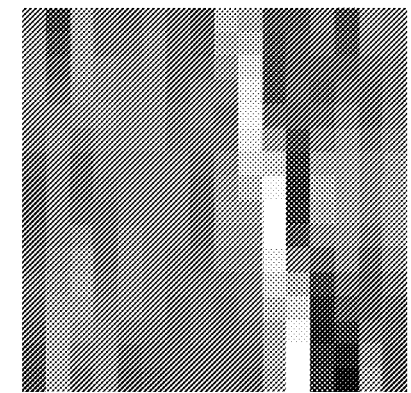
FIGS. 1A and 1B illustrate a residual block before transformation and quantization (FIG. 1A) and a reconstructed version of the residual block after transformation, quantization, dequantization and inverse transformation (FIG. 1B)
Figure 2B:
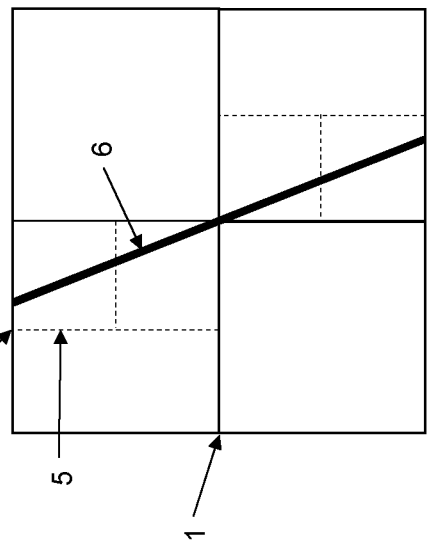
FIGS. 2A and 2B illustrate division of transform blocks according to prior art (FIG. 2A) and according to an embodiment (FIG. 2B)
Figure 1A:
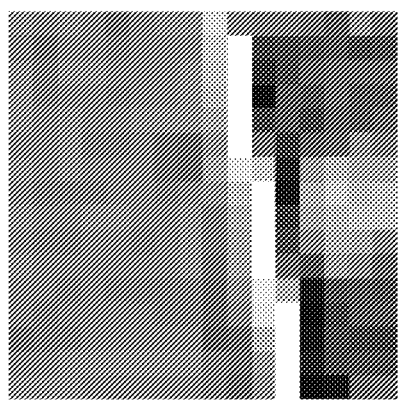
Figure 2A:
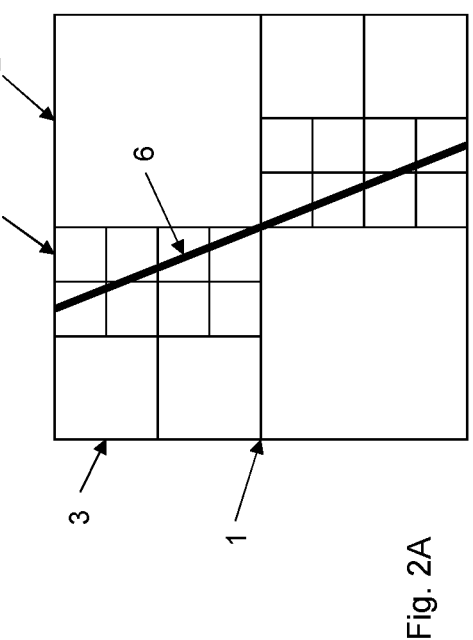

For instance, FIG. 2A illustrates a coding block 1 constituting a portion of a picture or frame of a video stream to be encoded. In this particular coding block 1, the picture has a smooth background with a line 6 crossing over the coding block 1. The coding block 1 thereby contains both smooth gradients (background) as well as local high frequency parts (line). In this case, the encoder needs to split the coding block 1 into ever smaller transform blocks 2, 3, 4 in order to effectively encode the coding block 1. Thus, a small transform block size 4 is needed for those parts of the coding block 1 that comprises the line 6, whereas correspondingly larger transform block sizes 2, 3 can be used for those parts of the coding block 1 that merely contain smooth background. In this illustrative prior art example of FIG. 2A, the coding block 1 has been split into 22 transform blocks due to the presence of the line 6 crossing through the coding block 1.

FIG. 2B illustrates an example according to an embodiment. In this case, the coding block 1 has been split into merely four transform blocks 2. The high frequency data due to the presence of the line 6 is instead taken care of by modifying sub-portions 5 of two of the reconstructed residual blocks obtained following inverse transforming the four transform blocks 2. This means that the embodiments can handle coding blocks 1 with both smooth gradients and local high frequency parts in a much more efficient way as compared to the prior art through the selective modification of sub-portion(s) of reconstructed residual blocks.

Generally, in video coding a coding block of samples or pixels, constituting a portion of a frame or picture of a video stream, is divided into one or more prediction blocks of a same size, in terms of number of samples, as the current block or for a portion of the current block. A respective intra prediction mode or inter prediction is then selected for each such prediction block. The difference between the sample values in the coding block and the selected predictions is calculated to get one or more residual blocks of samples having a respective prediction error value. A transform is then applied in transform blocks on the prediction error values with the same size as the current block or for a portion of the prediction error values to get one or more transform blocks of samples having a respective transform coefficient. The transform coefficients are then quantized and encoded. During decoding, the encoded data is decoded and dequantized to get the transform block(s) or rather reconstructed version(s) of the transform block(s). The transform block(s) is(are) inverse transformed to get reconstructed or decoded version(s) of the residual block(s) (reconstructed residual block(s)). The reconstructed or decoded prediction error values of the reconstructed version(s) of the residual block(s) are added to the prediction(s) to get a reconstructed version of the coding block.

In the art of video coding, inter prediction is used to exploit temporal statistical dependences, intra prediction exploits spatial statistical dependences and transform coding of the prediction residual, i.e. prediction error values, further exploits spatial statistical dependences. The transform coding involves transformation of the prediction error values in a residual block using a transform, preferably a linear spatial transform. Non-limiting but preferred examples of such transforms include Discrete Cosine Transform (DCT), Discrete Sine Transform (DST), Karhunen-Loève Transform (KLT), etc.

According to the invention a sub-portion but not all reconstructed prediction error values of the reconstructed version(s) of the residual block(s) is modified prior to addition to the prediction(s).

In the following, transform block is used to denote a block of samples having a respective transform coefficient and obtained by application of a transform of a residual block of samples having a respective prediction error value. Transform block is sometimes denoted transform unit in the art.

FIG. 3 is a flow chart illustrating a general concept of a method of transform block decoding according to an embodiment. The method comprises modifying, in step S1, respective reconstructed prediction error values of samples in a sub-portion of a residual block of samples obtained by inverse transforming a transform block of samples having a respective transform coefficient. The modification performed in step S1 affects reconstructed prediction error values of samples in the sub-portion of the residual block but not reconstructed prediction error values of samples in a remaining portion of the residual block.

Thus, the modification performed in step S1 merely affects the reconstructed prediction error values, sometimes denoted decoded prediction error values in the art, in a sub-portion of the residual block. This means that reconstructed prediction error values in a remaining portion of the residual block remain the same as prior to the modification. Accordingly, the modification is a spatially localized modification to a portion of the residual block.

The spatially localized modification in step S1 can thereby be used to, for instance, handle high frequencies data or compensate for visual artifacts from transform coding, such as in the form of transform basis patterns.

FIG. 4 is a flow chart illustrating a method of transform block decoding according to an embodiment. The method comprises inverse transforming, in step S10, a first transform block (1 ST TB) of samples having a respective transform coefficient to obtain a first residual block (1 ST RB) of samples having a respective reconstructed prediction error. The method also comprises inverse transforming, in step S11, a second transform block (2 ND TB) of samples having a respective transform coefficient to obtain a second residual block (2 ND RB) of samples having a respective reconstructed prediction error value. A following step S12 comprises modifying respective reconstructed prediction error values of samples in a sub-portion of the first residual block by respective reconstructed prediction error values of the second residual block. The modification performed in step S12 affects reconstructed prediction error values of samples in the sub-portion of the first residual block but not reconstructed prediction error values of samples in a remaining portion of the first residual block.

The two steps S10 and S11 of FIG. 4 can be performed serially in any order or at least partly in parallel.

Thus, the spatially localized modification of the reconstructed prediction error values in the sub-portion of the first residual block is in this embodiment achieved by using reconstructed prediction error values obtained by inverse transforming a second transform block.

In an embodiment, a same type of inverse transform can be applied to the first and second transform blocks in steps S10 and S11. For instance, a same type of inverse DCT transform is used. In an alternative embodiment, different types of transforms can have been used during video coding and transform coding when generating the first transform block and the second transform block. In such a case, a first transform is applied to a first residual block to get the first transform block and a second transform is applied to a second residual block to get the second transform block. The second transform may then have other features and characteristics as compared to the first transform. This means that a first inverse transform can be used in step S10 to obtain the first residual block from the first transform block and a second inverse transform can be used in step S11 to obtain the second residual block from the second transform block. The first (inverse) transform could then be a first (inverse) transform selected from a group comprising one or more types of DCTs, one or more types of DSTs, and one or more types of KLTs. The second (inverse) transform could then be a second, different (inverse) transform selected from this group. For instance, the first (inverse) transform could be a (inverse) DCT transform, whereas the second (inverse) transform is a (inverse) DST or KLT transform. In another example, the first (inverse) transform is a first type of (inverse) DCT transform and the second (inverse) transform is a second, different type of (inverse) DCT transform.

The sub-portion of the first residual block that is modified by the second residual block is typically a continuous sample area of adjacent sample positions in the first residual block. For instance, the sub-portion could correspond to one or a subset of the quadrants or quarters of the first residual block. This is shown in more detail in, for instance, FIGS. 16A-16C to be further discussed herein. The sub-portion could have different sizes or shapes in terms of number of samples including, for instance, a square shape of P×P samples or a rectangular shape of P×Q samples, wherein P, Q are integer numbers equal to or larger than one. In particular embodiment, in the case of a square shape (P×P samples), P is an integer equal to or larger than two. In another particular embodiment, in the case of a rectangular shape (P×Q samples), at least one of P and Q is an integer equal to or larger than two. In the case of a rectangular shape, the sub-portion could be in the form of 1×Q samples or P×1 samples. This corresponds to modifying the reconstructed prediction error values in one of the rows or columns in the first residual block. The row or column is preferably the first or last row or column in the first residual block. This would then correspond to modifying border sample positions in the first residual block.

In an alternative embodiment, the sample positions collectively constituting the sub-portion in the first residual block could be distributed to include non-adjacent sample positions. For instance, the sub-portion could constitute every second sample in the first residual block.

In a first implementation embodiment of the method shown in FIG. 4 as shown in FIG. 16A, the second residual block 21 has a smaller size in terms of number of samples as compared to the first residual block 11. Furthermore, the second residual block 21 corresponds to a sub-portion 12 of the first residual block 11. In this implementation embodiment, step S12 of FIG. 4 comprises modifying, sample by sample, the respective reconstructed prediction error values of the sub-portion 12 of the first residual block 11 by the respective reconstructed prediction error values of the second residual block 21.

FIG. 16A also shows the first transform block 10 and the second transform block 20, which are inverse transformed in steps S10 and S11, to get the first residual block 11 and the second residual block 21, respectively.

Modification sample by sample implies that a reconstructed prediction error value of a given sample in the sub-portion 12 of the first residual block 11 is modified by a reconstructed prediction error value of a corresponding sample in the second residual block 21. This corresponding sample occupies the same position within the second residual block 21 that the given sample occupies in the sub-portion 12 of the first residual block 11 (which could be different from the position of the given sample within the whole first residual block 11). For instance, the reconstructed prediction error value of the sample occupying the upper left corner in the sub-portion 12 of the first residual block 11 is modified by the reconstructed prediction error value of the corresponding sample occupying the upper left corner in the second residual block 21, and so on.

The final residual block (RB) 13 has, in this embodiment, modified reconstructed prediction error values using the second residual block 21 and unmodified reconstructed prediction error values corresponding to the "original" reconstructed prediction error values from the first residual block 11.

FIG. 5 is a flow chart illustrating an embodiment of the modifying step in FIG. 4. In this embodiment, the method continues from step S11 in FIG. 4. The following step S13 comprises adding, sample by sample, the reconstructed respective prediction error values of the second residual block 21 to the respective reconstructed prediction error values of the sub-portion 12 of the first residual block 11.

Figures 31, 32, 33:
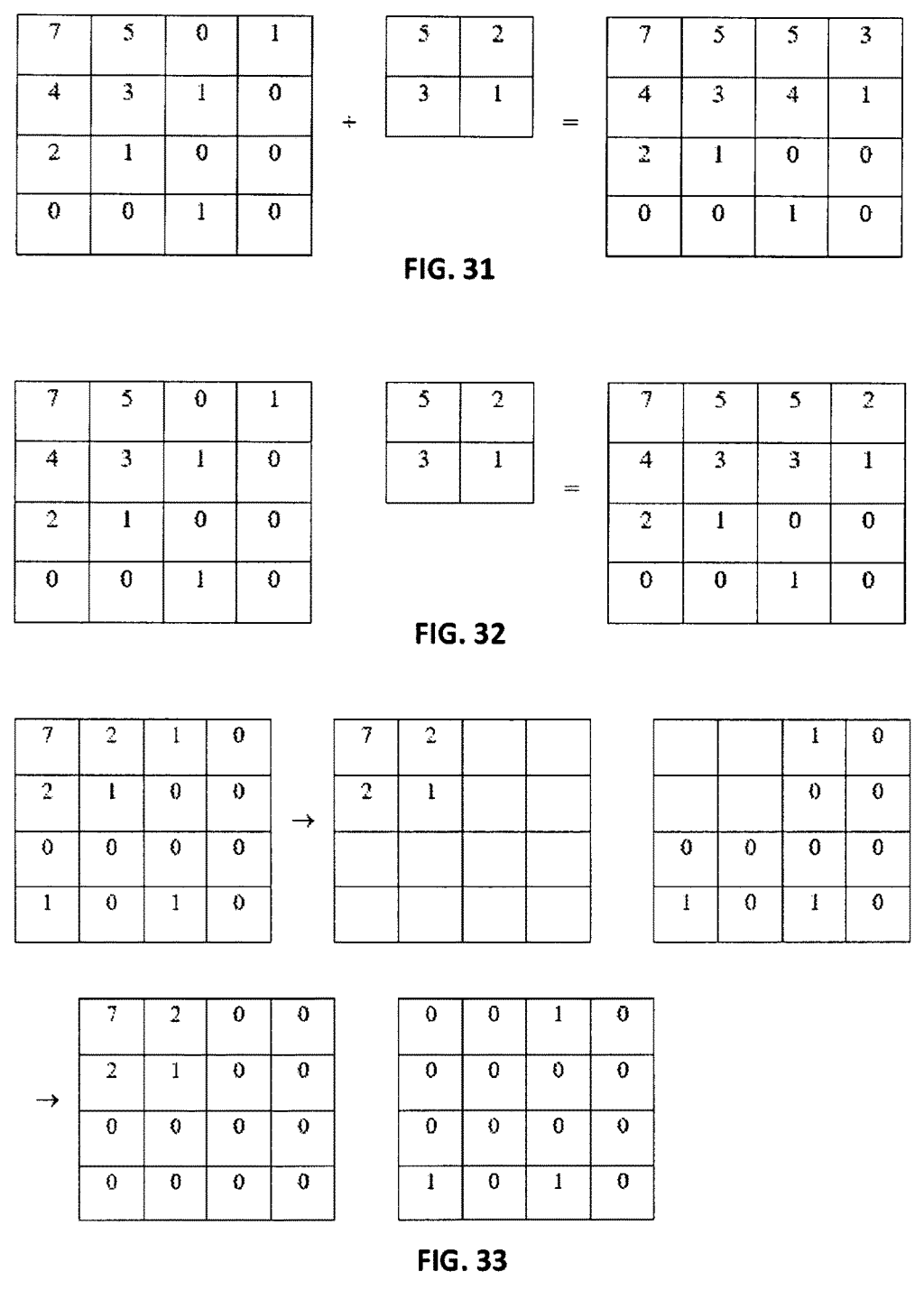

An example of such an addition is presented in FIG. 31, which illustrates a first residual block 11 of 4×4 samples and a second residual block 21 of 2×2 samples. The respective reconstructed prediction error values of the second residual block 21 are added to, in this example, the upper right 2×2 sub-portion of the first residual block 11.

In a related embodiment, the modification can be performed by adding, sample by sample, weighted versions of the reconstructed respective prediction error values of the second residual block 21 to the respective reconstructed prediction error values of the sub-portion 12 of the first residual block 11.

In such a case, a same weight could be used for all reconstructed prediction error values or different weights could be used for different prediction error values. In the latter case, the values of the weights could be defined based on the particular sample position within the second residual block 12. Alternatively, information could be provided from an encoder allowing determination of the weights.

In a further embodiment, the values of the weights could be deduced or determined based on the sample values of the intra or inter prediction for the current block.

FIG. 6 is a flow chart illustrating another embodiment of the modifying step in FIG. 4. In this embodiment, step S14 comprises replacing, sample by sample, the respective reconstructed prediction error values of the sub-portion 12 of the first residual block 11 by the respective reconstructed prediction error values of the second residual block 21.

The corresponding example for such a replacement is presented in FIG. 32.

In an embodiment, step S10 of FIG. 4 comprises inverse transforming a transform block 10 of 2N×2N samples having a respective transform coefficient to obtain a residual block 11 of 2N×2N samples having a respective reconstructed prediction error. Step S11 comprises, in this embodiment, see FIG. 16B, inverse transforming at least one transform block 20A-20D of N×N samples having a respective transform coefficient to obtain at least one residual block 21A-21D of N×N samples having a respective reconstructed prediction error value. Each residual block 21A-21D of the at least one residual block 21A-21D of N×N samples corresponds to a respective sub-portion 12A-12D of the residual block 11 of 2N×2N samples. In this embodiment, step S12 comprises modifying, sample by sample and for each residual block 21A-21D of the at least one residual block 21A-21D of N×N samples, the respective reconstructed prediction error values of a respective sub-portion 12A-12D of the residual block 11 of 2N×2N samples by the respective reconstructed prediction error values of the residual block 21A-21D of N×N samples.

In a particular embodiment, the residual block 11 of 2N×2N samples comprises four respective sub-portions 12A-12D, each representing a respective quarter or quadrant of residual block 11 of 2N×2N samples. The reconstructed prediction error values in one or more of these quarters 12A-12D can then be modified, such as by addition or replacement as mentioned above in connection with FIGS. 5 and 6, by reconstructed prediction error values from one or more residual blocks 21A-21D of N×N samples.

In an embodiment, the steps S11 and S12 of FIG. 4 are conditioned upon the value of at least one flag associated with the transform block 10 of 2N×2N samples. This means that in this embodiment S11 and S12 are performed if at least one flag associated with the transform block 10 of 2N×2N samples has a value indicating that transform coefficients are available for a 2N×2N transform block level.

In a first embodiment, a single flag is used. If the flag has a first value, such as 1bin (or 0bin), at least one transform block 20A-20D of N×N samples is available and should be used to modify the reconstructed prediction error values obtained by inverse transforming the transform block 10 of 2N×2N samples. This means that steps S11 and S12 should be performed in addition to step S10 in FIG. 4. However, if the flag has a second value, such as 0bin (or 1bin), no transform blocks 20A-20D of N×N samples are available for the current transform block 10 of 2N×2N samples. In this case, only step S10 but not steps S11 and S12 of FIG. 4 should be performed.

If the flag has the first value additional information, such as flags or other syntax elements, is preferably available and used to signal which quarter(s) 12A-12D of the reconstructed block 11 of 2N×2N samples that should be modified. This could be achieved by having, if the first flag mentioned above has the first value, four additional flags, one for each quarter 12A-12D. Then each such additional flag could signal whether the reconstructed prediction error values of the associated quarter 12A-12D should be modified or not. This approach thereby has the possibility of not modifying the residual block 11 of 2N×2N samples at all or modify one or more its quarters 12A-12D. This achieves a high flexibility in modifying reconstructed prediction error values and in spatially selecting the sub-portion(s) 12A-12D where such modification should take place.

In a slightly less flexible embodiment, a single transform block 20 of N×N samples may be available. In such a case, instead of using four additional flags, a single syntax element, such as a 2-bit syntax element, could be used to indicate the sub-portion 12A-12D, i.e. the quarter, that should be modified using the transform block 20 of N×N samples. An even less flexible embodiment is to predefine the position of the sub-portion 12A-12D in the residual block 11 of 2N×2N samples. In such a case, no syntax elements are needed for signaling the position of the sub-portion 12A-12D. A typical example of such a case is the bottom right corner for a residual block with intra prediction errors. This sub-portion of the residual block typically contains the largest prediction error values since it is furthest away from the reference samples used to define the intra prediction.

A further example is to derive the position of the sub-portion, e.g. quarter, in the residual block 11 of 2N×2N samples to be modified based on the sample values of the intra or inter prediction for the current block. Generally, corresponding sample positions in the prediction block of samples where the prediction is non-flat constitutes a suitable position for the sub-portion that should be modified by using the residual block 21 of N×N samples.

A further variant is to have a transform block 20 of N×N samples covering sample positions that not necessarily coincide with each other but rather cover a larger area. For instance, every second sample position in the residual block 11 of 2N×2N samples. Another example is positions where the intra or inter prediction for the block is non-flat as mentioned above. Thus, the sub-portion 12A-12D, i.e. quarter, that should be modified using the transform block 20 of N×N samples does not necessarily have to be a continuous sample area of adjacent sample positions. In clear contrast, the sample positions collectively constituting the sub-portion 12A-12D in the residual block 11 of 2N×2N samples could be distributed to include non-adjacent sample positions.

Figure 7:
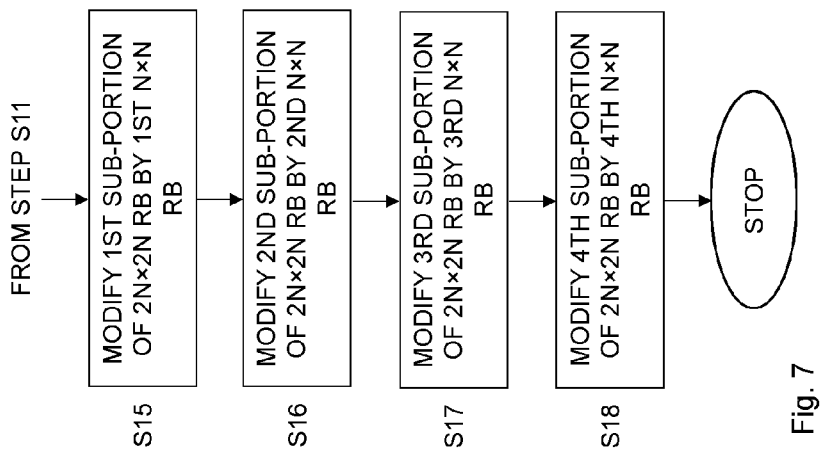
FIG. 7 is a flow chart illustrating a further embodiment of the modifying step in FIG. 4.

In another embodiment, step S10 of FIG. 4 comprises inverse transforming a transform block of 2N×2N samples having a respective transform coefficient to obtain a residual block 11 of 2N×2N samples having a respective reconstructed prediction error. Step S11 comprises, in this embodiment, inverse transforming four transform blocks 20A-20D of N×N samples having a respective transform coefficient to obtain four residual blocks 21A-21D of N×N samples having a respective reconstructed prediction error value. Each residual block 21A-21D of the four residual block 21A-21D of N×N samples corresponds to a respective sub-portion 12A-12D of the residual block 11 of 2N×2N samples. In this embodiment, step S12 comprises four sub-steps S15 to S18 as shown in FIG. 7. Step S15 comprises modifying, sample by sample, the respective reconstructed prediction error values of a first sub-portion 12A of the residual block 11 of 2N×2N samples by the respective reconstructed prediction error values of a first residual block 21A of N×N samples of the four residual blocks 21A-21D of N×N samples. Step S16 comprises modifying, sample by sample, the respective reconstructed prediction error values of a second sub-portion 12B of the residual block 11 of 2N×2N samples by the respective reconstructed prediction error values of a second residual block 21B of N×N samples of the four residual blocks 21A-21D of N×N samples. Step S17 comprises modifying, sample by sample, the respective reconstructed prediction error values of a third sub-portion 12C of the residual block 11 of 2N×2N samples by the respective reconstructed prediction error values of a third residual block 21C of N×N samples of the four residual blocks 21A-21D of N×N samples. Step S18 comprises modifying, sample by sample, the respective reconstructed prediction error values of a fourth sub-portion 12D of the residual block 11 of 2N×2N samples by the respective reconstructed prediction error values of a fourth residual block 21D of N×N samples of the four residual blocks 21A-21D of N×N samples.

In this embodiment, a respective transform 20A-20D of N×N samples is available and can be used to modify, such as shown in FIG. 5 or 6, the reconstructed prediction error values in each of the four N×N sub-portions 12A-12D in the residual block 11 of 2N×2N samples.

In a particular embodiment, two flags are associated with the transform block 10 of 2N×2N samples and can be used in order to determine whether modification of the reconstructed prediction error values obtained by inverse transforming the transform block 10 of 2N×2N samples should take place or not. In this embodiment, steps S10-S12 of FIG. 4 are performed if a first flag associated with the transform block 10 of 2N×2N samples has a value indicating that the transform block 10 of 2N×2N samples is split into the four transform blocks 20A-20D of N×N samples and if a second flag associated with the transform block 10 of 2N×2N samples has a value indicating that transform coefficients are available for a 2N×2N transform block level.

Figure 8:
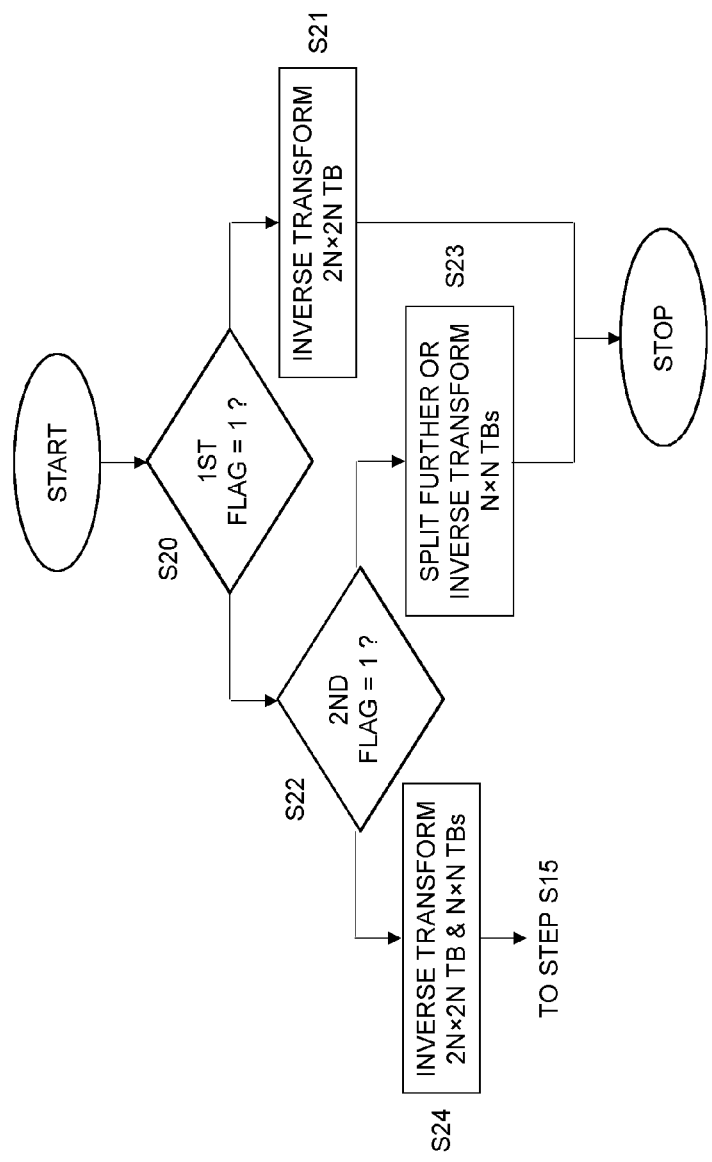
FIG. 8 is a flow chart illustrating additional, optional step of the method shown in FIG. 7.

This embodiment is shown in more detail in FIG. 8. The method starts in step S20, where the value of the first flag is investigated. If the first flag has, in this example, the value 0bin then no transform blocks 20A-20D of N×N samples are available for the current transform block 10 of 2N×2N samples. The transform block of 2N×2N samples 10 is thereby inverse transformed in step S21 to get the reconstructed block 13 of 2N×2N samples and no modification of the reconstructed prediction error values is performed. If, however, the first flag is equal to, in this example, 1bin, the method continues to step S22, in which the value of the second flag is checked. If this second flag is, in this example, equal to 0bin then no transform coefficients are available for the 2N×2N transform block levels. This basically corresponds to replacing or splitting the transform block of 2N×2N samples by or into four transform blocks of N×N samples. The four transform blocks of N×N samples are then inverse transformed in step S23 or at least one of them could be split further into four even smaller transform blocks. However, if the second flag is equal to 1bin as determined in step S22, the method continues to step S24, which comprises inverse transforming the transform block 10 of 2N×2N samples and the four transform blocks 20A-20D of N×N samples. The method then continues to step S15 in FIG. 7, where the reconstructed prediction errors of the residual block 11 of 2N×2N samples are modified as previously described herein.

In the above described embodiments, N is an integer number and preferably an integer equal to or larger than 2. In a particular embodiment, N=2n, wherein n is an integer equal to or larger than one. More preferably, n=1, 2, 3 or 4, or n=1, 2, 3, 4 or 5.

In an embodiment, not all of the four transform blocks 20A-20D of N×N samples are equal. This then means that different sub-portions 12A-12D of the residual block 11 of 2N×2N samples are exposed to different modifications. In a particular embodiment, at least one of the reconstructed prediction error values of at least one residual block 21A-21D of N×N samples is equal to zero.

FIG. 9 is a flow chart illustrating an embodiment of the modifying step S12 in FIG. 4 according to another implementation embodiment. Reference is also made to FIG. 16C. The method continues from step S11 in FIG. 4. A next step S30 comprises modifying respective reconstructed prediction error values in a sub-portion 22 of the second residual block 21. The following step S31 comprises adding, sample by sample, the respective reconstructed prediction error values of the second residual block 21 to the respective prediction error values of the first residual block 11.

In a particular embodiment, at least one of the reconstructed prediction error values in the second residual block 21 after the modification of the sub-portion 22 is zero. This means that in such a case the sample(s) in the second residual block 21 having zero reconstructed prediction error value will not modify the reconstructed prediction error value(s) for the corresponding sample(s) in the first residual block 11.

In a particular embodiment, the first and second transform blocks 10, 20 have the same size in terms of the number of samples and the first and second residual blocks 11, 21 have also the same size in terms of the number of samples.

In an embodiment, step S30 of FIG. 9 is performed as shown in FIG. 10. Hence, in this embodiment the modification comprises zeroing, in step S32, the respective reconstructed prediction error values in the sub-portion 22 of the second residual block 21. This means that the reconstructed prediction error values of the residual block 21 are then replaced by zero for those samples that are present in the sub-portion 22.

FIG. 11 illustrates another embodiment of step S30 in FIG. 9. In this embodiment the modification comprises multiplying, in step S33, each respective reconstructed prediction error value in the sub-portion 22 of the second residual block 21 with a respective weight.

In an embodiment, at least one of the weights is zero resulting in zeroing of the reconstructed prediction error value for at least one sample within the sub-portion 22 of the second residual block 21.

This is a more generalized embodiment as compared to zeroing all reconstructed prediction error values. This type of modification is less strict than simply zeroing and can achieve, for instance, a reduction in magnitude of reconstructed prediction error values for some of the samples. The respective weights could then be regarded as respective scaling factors. In order to avoid discontinuities between the sub-portion 22 of the second residual block 21 that is modified and the remaining portion of the second residual block 21 that is not modified, the scaling using the weights in step S33 can then go from a weight or scaling factor of one (implying no modification) down to a desired weighting factor or scaling factor, such as zero. This means that it is possible to go from a zeroing of reconstructed prediction error values to non-modified reconstructed prediction error values in one or more steps when moving along a row or column of samples in the sub-portion 22 of the second residual block 21. This in turn avoids discontinuities that may otherwise occur when going from a zeroed sample to an adjacent non-modified sample when crossing the border between the sub-portion 22 and the remaining portion in the second residual block 21.

The weights could be predefined and, for instance, be dependent on the sample position in the sub-portion 22. Alternatively, information provided from the encoder could be used to derive the weights.

FIG. 12 illustrates an additional, optional step of the method shown in FIG. 9. The method continues from step S11 in FIG. 4. A next step S34 comprises identifying the sub-portion 21 of the second residual block 21 based on a respective value of at least one flag associated with the second transform block 20. The method then continues to step S30 in FIG. 9.

In this embodiment, at least one flag is used to identify the sub-portion 22. In a first approach, the position of the sub-portion 22 could be fixed in the second residual block 21, for instance corresponding to the upper left quarter of the second residual block 21. In such a case, a single flag could be used to signal whether the reconstructed prediction error values in this sub-portion 22 should be modified or not.

In another embodiment, four flags could be associated with the second transform block 20. In such a case, each such flag is assigned for each respective quarter of the second residual block 21. This means that it is then possible to individually signal modification or no modification for each quarter in the second residual block 21.

A further variant is to a have a syntax element, such as 2-bit syntax element, associated with the second transform block 20. This syntax element could then signal the position of the sub-portion 22 within the second residual block 21 if the sub-portion 22 constitutes one of the four quarters of the second residual block 21.

It is also possible to deduce the position of the sub-portion 22 based on the inter or intra prediction, i.e. the sample values of the particular inter or intra prediction, which has previously been described herein.

In an embodiment, step S10 of FIG. 4 comprises inverse transforming the first transform block 10 of samples having a respective zero-frequency or low frequency transform coefficient to obtain the first residual block 11. In this embodiment, step S11 comprises inverse transforming the second transform block 20 of samples having a respective high frequency transform coefficient to obtain the second residual block 21.

The two transform blocks 10, 20 thereby complement each other with the first transform block 10 carrying the zero-frequency, i.e. DC, and low frequency transform coefficients, whereas the second transform block 20 carries high frequency transform coefficients. After inverse transformation in steps S10 and S11, the first residual block 11 will thereby comprise the DC and low-frequency contribution of the reconstructed prediction errors whereas the second residual block 21 comprises the high frequency contribution of the reconstructed prediction errors. In such a case, it is then possible to zero or at least suppress the high frequency contribution for a sub-portion 22 of the residual block 13 in the modification step S30. By then adding the two residual blocks 11, 21 together in step S31 the resulting residual block 13 will have a portion of samples with only DC and low frequency contributions to the reconstructed prediction errors, whereas remaining portion of the residual block 13 will have samples with both DC, low and high frequency contributions to the reconstructed prediction errors.

In another embodiment, zeroing or suppression could instead be applied to zero-frequency and/or low frequency contribution. In such a case, the modification is performed on a sub-portion of the first residual block 11 instead of the second residual block 21. It is also possible to combine these approaches. In such a case, zero-frequency and/or low frequency contribution in a sub-portion of the first residual block 11 is modified and high frequency contribution in a sub-portion of the second residual block 21 is modified. The two sub-portions typically have different positions within the residual blocks 11, 21.

Low frequency contribution and low frequency transform coefficient as used herein preferably relate to up to the mth order of changes, whereas high frequency contribution and high frequency transform coefficient relate to from the (m+1)th order of changes. For instance, the first transform block 10 could comprise the DC and 1st order transform coefficients, whereas the second transform block 20 carries 2nd and higher orders transform coefficients.

In an embodiment, two transform blocks 10, 20 as mentioned above could be generated during encoding and decoding. Alternatively, a single transform block is used and then split into the first and second transform blocks 10, 20. In such a case, the method preferably comprises the optional step S40 as shown in FIG. 13. This step S40 comprises splitting a transform block of samples having a respective transform coefficient into the first transform block 10 and the second transform block 20. The method then continues to step S10 in FIG. 4.

Figure 14:
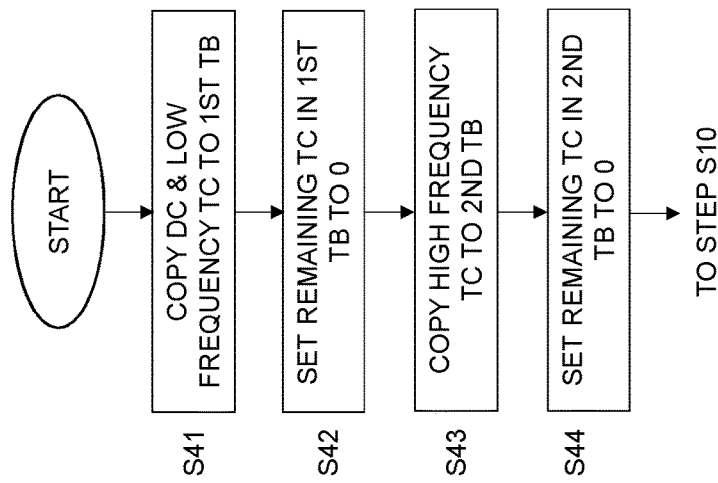
FIG. 14 is a flow chart illustrating an embodiment of the splitting step in FIG. 13.

FIG. 14 is a flow chart illustrating a preferred implementation of the splitting step S40 in FIG. 14. The method comprises copying, in step S41, the respective zero-frequency and low frequency transform coefficients from the transform block into zero-frequency and low frequency sample positions in the first transform block 10. A following step S42 comprises setting remaining sample positions in the second transform block 10 to zero. Step S43 comprises copying the respective high frequency transform coefficients from the transform block into high frequency sample positions in the second transform block 20. The following step S44 comprises setting remaining positions in the second transform block 20 to zero.

The sample positions set to zero in step S42 are preferably the high frequency sample positions in the first transform block 10. Correspondingly, the sample positions set to zero in step S44 are preferably the zero-frequency and low frequency sample positions in the second transform block 20. Accordingly, the first transform block 10 then comprises zero-frequency and low frequency transform coefficients but preferably no high frequency transform coefficients. The second transform block 20 correspondingly preferably comprises high frequency transform coefficients but no zero-frequency or low frequency transform coefficients.

This procedure is schematically illustrated in FIG. 33 showing, in a first step, splitting of the transform block into the first and second transform block by copying the zero and low frequency transform coefficients and the high frequency transform coefficients, respectively. In a second step, remaining sample positions are set to zero.

An alternative approach is to omit using the basis functions of a transform that correspond to transform coefficient that should be equal to zero when deriving the reconstructed prediction error values of a residual block.

Figure 15:
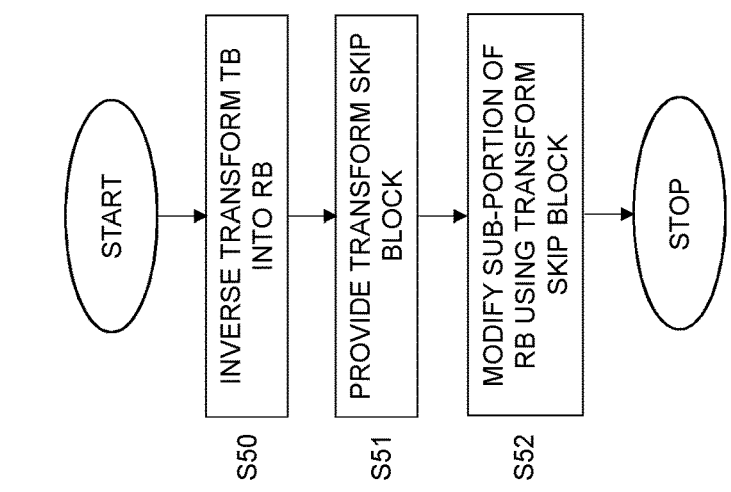
FIG. 15 is a flow chart illustrating a method of transform block decoding according to another embodiment.

FIG. 15 is a flow chart illustrating a method of transform block decoding according to a further implementation embodiment. Reference is also made to FIG. 16D. In this implementation embodiment, the method starts in step S50, which comprises inverse transforming a transform block 10 of samples having a respective transform coefficient to obtain a residual block 11 of samples having a respective reconstructed prediction error value. A next step S51 comprises providing a transform skip block 25 of samples having a respective prediction error value. In an embodiment, the transform skip block 25 has a smaller size in terms of number of samples as compared to the residual block 11. The following step S52 comprises modifying, sample by sample, respective reconstructed prediction error values in a sub-portion 12 of the residual block 11 by respective prediction error values of the transform skip block 25. The modification performed in step S52 affects reconstructed prediction error values of samples in the sub-portion 12 of the residual block 11 but not reconstructed prediction error values of samples in a remaining portion of the residual block 11.

A transform skip block 25 as used herein is a transform block for which the transformation is bypassed. This means that the coefficients of the samples in the transform skip block 25 are the spatial residual samples, i.e. the prediction error values. Accordingly, no inverse transformation is needed in order to obtain the prediction error values of the transform skip block 25.

The modification in step S52 can be performed in similarity to what has been described in connection with FIGS. 5 and 6. Hence, in an embodiment, step S52 comprises adding, sample by sample, the respective prediction error values of the transform skip block 25 to the respective reconstructed prediction error values of the sub-portion 12 of the residual block 11. In another embodiment, step S52 comprises replacing, sample by sample, the respective reconstructed prediction error values of the sub-portion 12 of the residual block 11 by the respective prediction error values of the transform skip block 25.

The particular position of the sub-portion 12 can be signaled as previously described herein in connection with FIG. 16A.

The discussion provided above with regard to shape of the sub-portion 12 and continuous or distributed sub-portion 12 also applies to the embodiment using a transform skip block to modify reconstructed prediction error values in a residual block instead of using another transform block.

The above described methods and embodiments are typically performed in or by a decoder during decoding of a coded video stream, and pictures or frames within the coded video stream. However, inverse transformation is also performed during encoding when an encoder tests which prediction(s) to use when encoding a coding block. Hence, the method can also be performed in or by an encoder during encoding of a video stream.

The encoder preferably provides information to the decoder instructing the decoder to perform the modification of reconstructed prediction error values as disclosed herein. This type of information could be one or more flags and/or one or more syntax elements included in the coded video bitstream. This type of information could be included in a parameter set, such as video parameter set (VPS), sequence parameter set (SPS), picture parameter set (PPS), of or associated with the coded video bitstream. Alternatively, or in addition, the information could be included in a slice header or indeed in the coded payload data for the pictures or frames of video stream.

Instead of or as a complement to flag(s) and/or syntax element(s), the information could include the sample values of the inter or intra prediction that are to be added to the reconstructed prediction error values of the residual block after modification. For instance, the sample values of the inter or intra prediction can be used by the decoder in order to identify the sub-portion of the residual block that should be modified using the second residual block or the transform skip block as disclosed herein. For instance, sub-portions in the residual block having the same sample positions as corresponding portions in the inter or intra prediction that are determined to be non-flat, i.e. larger difference between the maximum and minimum sample values in the inter or intra prediction, could be identified as suitable for modification.

The following methods and embodiments are typically performed in or by an encoder during encoding of a video stream, and pictures or frames within the video stream. These methods and embodiments thereby produce the transform block(s) discussed in the previously "decoding-related" methods and embodiments. Accordingly, information and procedures described in the foregoing in connection with "decoding-related" embodiments apply mutatis mutandis to the corresponding "encoding-related" embodiments.

In a general concept of a method of transform block encoding, the method comprises transforming a residual block of samples having a respective prediction error value into a transform block of samples having a respective transform coefficient. The method also comprises providing information instructing a decoder to modify respective reconstructed prediction error values in a sub-portion of a reconstructed version of the residual block obtained based on the transform block. The modification performed based on the provided information affects reconstructed prediction error values of samples in the sub-portion of the reconstructed version of the residual block but not reconstructed prediction error values of samples in a remaining portion of the reconstructed version of the residual block.

Figure 17:
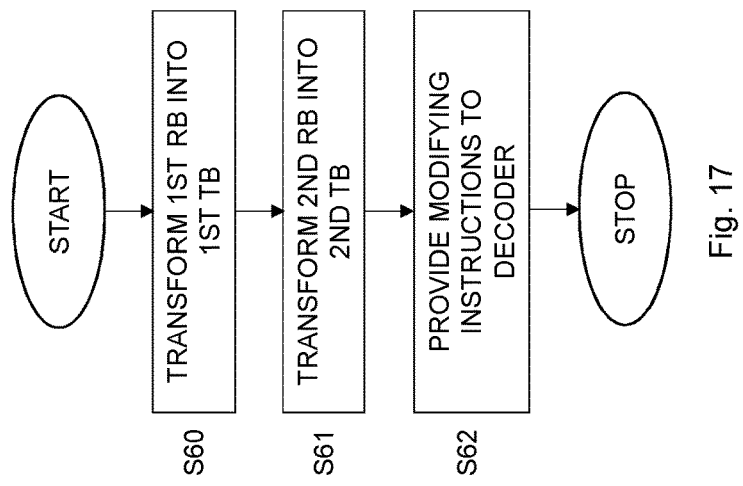
FIG. 17 is a flow chart illustrating a method of transform block encoding according to an embodiment.

FIG. 17 is a flow chart illustrating a method of transform block encoding according to an embodiment. The method comprises transforming, in step S60, a first residual block of samples having a respective prediction error value into a first transform block of samples having a respective transform coefficient. The method also comprises transforming, in step S61, a second residual block of samples having a respective prediction error value into a second transform block of samples having a respective transform coefficient. The method further comprises providing, in step S62, information instructing a decoder to modify respective reconstructed prediction error values in a sub-portion of a reconstructed version of the first residual block obtained based on the first transform block by respective reconstructed prediction error values of a reconstructed version of the second residual block obtained based on the second transform block. The modification affects reconstructed prediction error values of samples in the sub-portion of the reconstructed version of the first residual block but not reconstructed prediction error values of samples in a remaining portion of the reconstructed version of the first residual block.

This "encoding-related" method operates on an original residual block of samples having a respective prediction error value. The residual block is then transformed to get a transform block of samples having a respective transform coefficient. The transform coefficients are then further processed as described herein (quantized and then dequantized). A reconstructed version of the (original) residual block is then obtained based on the transform block. In more detail, the quantized and then dequantized transform coefficients are then input to an inverse transform to get the reconstructed version of the residual block of samples having a respective reconstructed prediction error value.

In an embodiment, see FIG. 16A, the second residual block 21 has a smaller size in terms of number of samples as compared to the first residual block 11. The second residual block 21 also corresponds to a sub-portion 12 of the first residual block 11. In this embodiment, the modification comprises modifying, sample by sample, the respective reconstructed prediction error values of the sub-portion 12 of the reconstructed version of the first residual block 11 obtained based on the first transform block 10 by respective reconstructed prediction error values of a reconstructed version of the second residual block 21 obtained based on the second transform block 20.

The modification can, as has been previously described herein, be performed as sample-by-sample addition or replacement.

In this embodiment, the information provided includes information notifying the decoder of the presence of a second transform block 20 and preferably also information indicating the position of the sub-portion 12 in the first residual block 11. The information may be in the form of one or more flags, one or more syntax elements and/or information indirectly defining the presence of the second transform block 20 and/or the position of the sub-portion 11. This type of information could be the particular values of the inter or intra prediction used for the first residual block 11 and optionally also the prediction error values of the first residual block 11.

In another embodiment, see FIG. 16B, step S60 comprises transforming a residual block 11 of 2N×2N samples having a respective prediction error value to obtain a transform block 10 of 2N×2N samples having a respective transform coefficient. Step S61 comprises transforming at least one residual block 21A-21D of N×N samples having a respective prediction error value to obtain at least one transform block 20A-20D of N×N samples having a respective transform coefficient. In this embodiment, each residual block 21A-21D of the at least one residual block 21A-21D of N×N samples corresponds to a respective sub-portion 12A-12D of the residual block 11 of 2N×2N samples. In this embodiment, the modification comprises modifying, sample by sample and for each transform block 20A-20D of the at least one transform block 20A-20D of N×N samples, the respective reconstructed prediction error values of a respective sub-portion 12A-12D of a reconstructed version of the residual block 11 of 2N×2N samples obtained based on the transform block 10 of 2N×2N samples by respective reconstructed prediction error values of a reconstructed version of a residual block 21A-21D of N×N samples obtained based on the transform block 20A-20D of N×N samples.

In a particular embodiment, step S62 comprises setting at least one flag associated with the transform block 10 of 2N×2N samples to a value indicating that transform coefficients are available for a 2N×2N transform block level.

In this embodiment, the information provided comprises the at least one flag.

In a further embodiment, step S60 comprises transforming a residual block 11 of 2N×2N samples having a respective prediction error value to obtain a transform block 10 of 2N×2N samples having a respective transform coefficient. Step S61 comprises transforming four residual blocks 21A-21D of N×N samples having a respective prediction error value to obtain four transform blocks 20A-20D of N×N samples having a respective transform coefficient. In this embodiment, each residual block 21A-21D of the four residual blocks 21A-21D of N×N samples corresponds to a respective sub-portion 12A-12D of the residual block 11 of 2N×2N samples. In this embodiment, the modification comprises modifying, sample by sample, the respective reconstructed prediction error values of a first sub-portion 12A of a reconstructed version of the residual block 11 of 2N×2N samples obtained based on the transform block 10 of 2N×2N samples by respective reconstructed prediction error values of a reconstructed version of a first residual block 21A of N×N samples obtained based on a first transform block 20A of N×N samples of the four transform blocks 20A-20D of N×N samples. The modification also comprises modifying, sample by sample, the respective reconstructed prediction error values of a second sub-portion 12B of the reconstructed version of the residual block 11 of 2N×2N samples by respective reconstructed prediction error values of a reconstructed version of a second residual block 21B of N×N samples obtained based on a second transform block 20B of N×N samples of the four transform blocks 20A-20D of N×N samples. The modification further comprises modifying, sample by sample, the respective reconstructed prediction error values of a third sub-portion 12C of the reconstructed version of the residual block 11 of 2N×2N samples by respective reconstructed prediction error values of a reconstructed version of a third residual block 21C of N×N samples obtained based on a third transform block 20C of N×N samples of the four transform blocks 20A-20D of N×N samples. The modification additionally comprises modifying, sample by sample, the respective reconstructed prediction error values of a fourth sub-portion 12D of the reconstructed version of the residual block 11 of 2N×2N samples by respective reconstructed prediction error values of a reconstructed version of a fourth residual block 21D of N×N samples obtained based on a fourth transform block 20D of N×N samples of the four transform blocks 20A-20D of N×N samples.

In an embodiment, step S62 of FIG. 17 is performed as shown in FIG. 18. The method continues from step S61 in FIG. 18. A next step S63 comprises setting a first flag associated with the transform block 10 of 2N×2N samples to a value indicating that the transform block 10 of 2N×2N samples is split into the four transform blocks 20A-20D of N×N samples. The method also comprises setting, in step S64, a second flag associated with the transform block 10 of 2N×2N samples to a value indicating that transform coefficients are available for a 2N×2N block level.

In this embodiment, the information provided comprises the first and second flags.

In another embodiment, see FIG. 16C, the modification then preferably comprises modifying respective reconstructed prediction error values in a sub-portion 22 of a reconstructed version of the second residual block 21 obtained based on the second transform block 20. The modification also comprises adding, sample by sample, the respective reconstructed prediction error values of the reconstructed version of the second residual block 21 to the respective reconstructed prediction error values of the reconstructed version of the first residual block 11 obtained based on the first transform block 10.

In an embodiment, modifying the respective reconstructed prediction error values comprises zeroing the respective reconstructed prediction error values in the sub-portion 22 of the reconstructed version of the second residual block 21.

In another embodiment, modifying the respective reconstructed prediction error values comprises multiplying each respective reconstructed prediction error value in the sub-portion 22 of the reconstructed version of the second residual block 21 with a respective weight.

In an optional embodiment, step S62 of FIG. 17 is performed as shown in FIG. 19. The method continues from step S61 in FIG. 17. A next step S65 comprises setting at least one flag associated with the second transform block 20 to a respective value indicating a position of the sub-portion 22 in the reconstructed version of the second residual block 21.

In this embodiment, the information provided comprises the at least one flag.

In yet another embodiment, step S60 comprises transforming the first residual block 11 into the first transform block 10 of samples having a respective zero-frequency or low frequency transform coefficient. In this embodiment, step S61 comprises transforming the second residual block 21 into the second transform block 20 of samples having a respective high frequency transform coefficient.

In another embodiment, step S62 of FIG. 17 comprises providing information to the decoder to split the transform block into a first transform block 10 of samples having a respective zero-frequency or low frequency transform coefficient and a second transform block 20 of samples having a respective high frequency transform coefficient. This split of the transform block is performed by copying respective zero-frequency and low frequency transform coefficients from the transform block into zero-frequency and low frequency sample positions in the first transform block 10 and setting remaining sample positions in the first transform block 10 to zero. The split also comprises copying respective high frequency transform coefficients from the transform block into high frequency sample positions in the second transform block 20 and setting remaining sample positions in the second transform block 20 to zero. In this embodiment, the modification comprises modifying respective reconstructed prediction error value in a sub-portion 22 of a reconstructed version of a second residual block 21 of samples obtained based on the second transform block 20. The modification also comprises adding, sample by sample, the respective reconstructed prediction error values of the reconstructed version of the second residual block 21 to respective reconstructed prediction error values of the reconstructed version of the first residual block 11 obtained based on the first transform block.

The modification to the reconstructed prediction error values in the sub-portion 22 can be performed as previously described herein, such as by zeroing or multiplication by a respective weight or scaling factor.

In this embodiment, the information provided comprises the split information and preferably information of the position of the sub-portion 22 within the second residual block 21.

If the second transform block 20 is mainly employed in order to reduce high frequency error in a portion of a residual block then the usage of such a second transform block 20 together with a (first) transform block could be conditioned on the presence of high frequency coefficients in the transform block. If no such high frequency coefficients are present in the transform block, then no second transform block 20 is needed. This enables no extra overhead if the transform block only contains some few low frequency coefficients.

Figure 20:
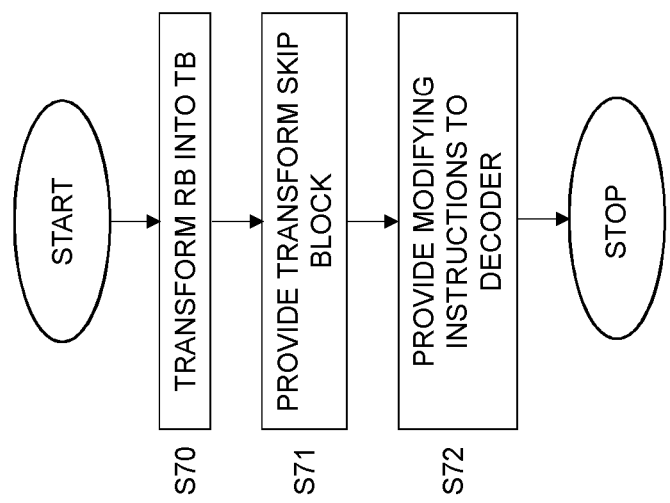
FIG. 20 is a flow chart illustrating a method of transform block encoding according to another embodiment.

FIG. 20 illustrates another embodiment of a method of transform block encoding, see also FIG. 16D. The method comprises transforming, in step S70 a residual block 11 of samples having a respective prediction error value into a transform block 10 of samples having a respective transform coefficient. The method also comprises providing, in step S71, a transform skip block 25 of samples having a respective prediction error value. The transform skip block 25 has a smaller size in terms of number of samples as compared to the residual block 11. The following step S72 comprises providing information instructing a decoder to modify respective reconstructed prediction error values of samples in a sub-portion 12 of a reconstructed version of the residual block 11 obtained based on the transform block 10 by respective prediction error values of the transform skip block 25. The modification affects reconstructed prediction error values of samples in the sub-portion 12 of the reconstructed version of the residual block 11 but not reconstructed prediction error values in a remaining portion of the reconstructed version of the residual block 11.

The modification can, as has been previously described herein, in the form of addition or replacement.

As has previously been described herein, during transform coding the transform coefficients of the transform block are quantized to obtain quantized transform coefficients. In this embodiment, a reconstructed version of a residual block is obtained based on the transform block by dequantizing the quantized transform coefficients to obtain a reconstructed version of the transform coefficients (reconstructed version of the transform block). The reconstructed version of the transform coefficients are then inverse transformed to obtain the reconstructed version of the residual block.

In some of the described embodiments, multiple transform blocks or one transform block and one transform skip block are used. In such a case, different quantization parameters (QPs) can be used during quantization and dequantization for the different transform blocks. It is also possible to use the same QP.

As is well known in the art, samples of a picture or frame in a video stream comprises a sample value typically representing a color of the sample. Color is often represented by multiple, such as three, color components. Different color formats are known in the art and can be used during video coding. For instance, color can be represented by a triplet in the form of a luminance value and two chrominance values or by triplet in the form of a red value, a green value and blue value. The prediction error values and reconstructed prediction error values as described herein can therefore represent prediction error values for such a color component, e.g. a prediction error value for the luminance component or a prediction error value for a chrominance component.

A feature of the embodiments is to improve spatially localized portions of a residual block, where a transform has been used for coding of the residual, before it is added to the intra/inter prediction. An indicator that indicates if the spatially localized modification is used or not used can be provided if a coded residual exists, e.g. if the corresponding coded block flag (cbf) is non-zero. The indication of which parts that shall be modified and how they shall be modified can either be explicitly signaled or be derived implicitly from the intra/inter prediction, block size, or other known data.

The visual artifacts from transform coding can be reduced by improving spatially localized portions of a residual block before it is added to the intra/inter prediction. This can, for instance, be done either by coding a large block containing high frequencies and then removing them for parts of the residual block, or by coding a large block with little or no high frequencies, and coding smaller transforms for parts of the residual block to add the high frequencies there.

The modifications as taught herein can be selected to be used in a residual block that contains a coded residual. The residual block is the difference between a block of original sample values and a block of intra/inter predicted sample values. This is also referred to prediction error. The encoder then codes the residual block typically by applying a transform and quantizes the transform coefficients and then entropy encodes the quantized transform coefficients. If all quantized transform coefficients are equal to 0 the transform block contains no coded residual and the modification is not used. The coded bitstream is then stored or transmitted to a decoder which decodes the encoded bitstream. The residual decoding process comprises entropy decoding the quantized transform coefficients, inverse quantize them, and apply the inverse transform to derive decoded residual samples. The encoder also generates a version of decoded residual samples. The decoded residual samples are then added to the intra/inter predicted samples. The residual or the decoded residual is in the sample domain in contrast to transform coefficients or quantized transform coefficients, which are in the transform domain.

A basic idea is that some or all of the transform basis functions of a transform block can represent the residual very well in many parts of the transform block but that some of the transform basis functions have a negative impact on a portion of the decoded residual, for instance due to quantization of the transform coefficients. The negative impact can be shown as transform patterns in the decoded residual block that also appears after the intra/inter prediction have been added. Thus, by modifying a localized portion(s) of a decoded residual block a better reconstruction can be achieved.

Here below various examples will be briefly described.

Example 1

One example of localized modification of a (decoded) residual block derived by a transform T is to not include the contributions from one or several basis functions of the transform T for a localized sub-portion of the residual block. An important case of this is to allow DC and 1st order changes (ramp) but not include contributions from transform basis functions that have more wavelike appearance, i.e. higher order changes. Thus, artifacts from the quantization can be avoided in areas only requiring some smooth changes. This can for example be implemented by zeroing the contribution from transform basis functions that should not be included or zeroing the transform coefficients for the transform basis functions that should not be included for a localized sub-portion of the residual block. It can also be less strict to just reduce the magnitude of some decoded residual samples, for example by sample-wise multiplication of samples with a scaling factor. To avoid discontinuities between the remaining portion that does not have any magnitude modification and the sub-portion that has reduced magnitude, the scaling can go between a scaling factor corresponding to 1 (meaning no reduction in magnitude) to a value corresponding to the actual scaling factor. A typical value of the actual scaling factor is 0, e.g. to completely remove the contribution from one or several transform basis functions to a localized sub-portion of the residual block.

Example 2

Another example of localized modification of a (decoded) residual block derived by a transform T is to include the contribution from a smaller transform Tn in a sub-portion of the residual block of the transform T where there is a negative effect of the transform T. In this case a better representation of the residual can be achieved. The modification in this case can either completely replace the contribution from the transform T in the sub-portion of the residual block or be additive to the contribution of some transform basis functions of the transform T. The smaller transform Tn can have another quantization parameter (QP), e.g. lower QP, than the transform T or the smaller transform can use same QP as the transform T.

Example 3

Another example of localized modification of a (decoded) residual block derived by a transform T is to include contributions from a non-transform TS (transform skip in HEVC vocabulary) to a sub-portion of the residual block, where the TS either is additive to the decoded residual of T or replaces the decoded residual samples of T. The replacement could be for non-zero samples of the TS. The non-transform TS can have another QP, e.g. lower QP, than the transform T or TS can use same QP as the transform T.

Example 4

In cross component prediction the residual for the chrominance (chroma) is predicted from the residual from the luminance (luma). Also, lately the residual for the second chroma component has been predicted from the first chroma component. The embodiments can be used to omit using all of the luma residual but restrict the prediction from one or several transform basis functions of the luma transform. This is similar in spirit as Example 1.

Example 5

When the localized modification of the (decoded) residual block derived by the transform T is explicitly included in the coded video bitstream a typical approach would be to define the selection by a quadtree with root at a transform block covering the current used transform T. If an adjustTransformFlagRoot is set to 1 it means that the approach is used, and the current transform block is split into 4 leaves where each leaf has a splitAdjustTransformFlag (unless the leaf has the smallest possible block size and no further split is possible) that indicates if the respective leaf should be split further. When no more splits are performed, the corresponding leaf has an adjustTransformFlagLeaf that indicates if the approach is used or of it is not used. The adjustTransformFlagRoot flag (and adjustTransformFlagLeaf flag if adjustment is used) is only provided in the coded video bitstream when there exist non-zero transform coefficients for the transform block. The meaning of the adjustTransformFlagLeaf is in its simplest form that contributions from some of the transform basis functions is not included for that portion of the transform block (Example 1). Another meaning of localization is to apply another but smaller transform instead of the larger transform when the flag is set and add the contributions from that to the contributions of the larger transform or that it replaces the contributions of the large transform (Example 2). Yet another meaning of the localization is to apply a non-transform in addition to the large transform when the flag is set (Example 3). The residual from the non-transform is added to the residual of the large transform or the samples with non-zero coefficients replaces the residual of the large transform.

Example 6

When the localized modification of the (decoded) residual block derived by transform T is implicit based on intra/inter prediction the localization is determined for samples that has a small variation between the max and min sample value, e.g. relatively smooth areas (could also be a slanted planar surface). Such samples are to a larger extent exposed to bad refinements by a transform coded residual if the transform block contains correction of an intra/inter prediction with incorrect positioning of edges. The localization can be sample-based or block-based. The samples that are localized can then used together with any of Example 1-3.

Another aspect of the embodiments relates to a device for transform decoding. The device is configured to modify respective reconstructed prediction error values of samples in a sub-portion of a residual block of samples obtained by inverse transforming a transform block of samples having a respective transform coefficient. The modification performed by the device affects reconstructed prediction error values of samples in the sub-portion of the residual block but not reconstructed prediction error values of samples in a remaining portion of the residual block.

A further aspect of the embodiments relates to a device for transform decoding. The device is configured to inverse transform a first transform block of sample having a respective transform coefficient to obtain a first residual block of samples having a respective reconstructed prediction error value. The device is also configured to inverse transform a second transform block of samples having a respective transform coefficient to obtain a second residual block of samples having a respective reconstructed prediction error value. The device is further configured to modify respective reconstructed prediction error values of samples in a sub-portion of the first residual block by respective reconstructed prediction error values of the second residual block. The modification performed by the device affects reconstructed prediction error values of samples in the sub-portion of the first residual block but not reconstructed prediction error values of samples in a remaining portion of the first residual block.

In an embodiment, the second residual block has a smaller size in terms of number of samples as compared to the first residual block and the second residual block corresponds to a sub-portion of the first residual block. The device is further configured to modify, sample by sample, the respective reconstructed prediction error values of the sub-portion of the first residual block by the respective reconstructed prediction error values of the second residual block.

In a particular embodiment, the device is configured to add, sample by sample, the respective reconstructed prediction error values of the second residual block to the respective reconstructed prediction error values of the sub-portion of the first residual block.

In another particular embodiment, the device is configured to replace, sample by sample, the respective reconstructed prediction error values of the sub-portion of the first residual block by the respective reconstructed prediction error values of the second residual block.

In an embodiment, the device is configured to inverse transform a transform block of 2N×2N samples having a respective transform coefficient to obtain a residual block of 2N×2N samples having a respective reconstructed prediction error value. The device is also configured to inverse transform at least one transform block of N×N samples having a respective transform coefficient to obtain at least one residual blocks of N×N samples having a respective reconstructed prediction error value. Each residual block of the at least one residual block of N×N samples corresponds to a respective sub-portion of the residual block of 2N×2N samples. The device is further configured to modify, sample by sample and for each residual block of the at least one residual block of N×N samples, the respective reconstructed prediction error values of a respective sub-portion of the residual block of 2N×2N samples by the respective reconstructed prediction error values of the residual block of N×N samples.

In a particular embodiment, the device is configured to perform inverse transforming the at least one transform block of N×N samples and modifying the respective reconstructed prediction error values if at least one flag associated with the transform block of 2N×2N samples has a value indicating that transform coefficients are available for a 2N×2N transform block level.

In an embodiment, the device is configured to inverse transform a transform block of 2N×2N samples having a respective transform coefficient to obtain a residual block of 2N×2N samples having a respective reconstructed prediction error value. The device is also configured to inverse transform four transform blocks of N×N samples having a respective transform coefficient to obtain four residual blocks of N×N samples having a respective reconstructed prediction error value. Each residual block of the four residual blocks of N×N samples corresponds to a respective sub-portion of the residual block of 2N×2N samples. The device is further configured to modify, sample by sample, the respective reconstructed prediction error values of a first sub-portion of the residual block of 2N×2N samples by the respective reconstructed prediction error values of a first residual block of N×N samples of the four residual blocks of N×N samples. The device is additionally configured to modify, sample by sample, the respective reconstructed prediction error values of a second sub-portion of the residual block of 2N×2N samples by the respective reconstructed prediction error values of a second residual block of N×N samples of the four residual blocks of N×N samples. Furthermore, the device is configured to modify, sample by sample, the respective reconstructed prediction error values of a third sub-portion of the residual block of 2N×2N samples by the respective reconstructed prediction error values of a third residual block of N×N samples of the four residual blocks of N×N samples. The device is also configured to modify, sample by sample, the respective reconstructed prediction error values of a fourth sub-portion of the residual block of 2N×2N samples by the respective reconstructed prediction error values of a fourth residual block of N×N samples of the four residual blocks of N×N samples.

In a particular embodiment, the device is configured to perform inverse transforming the transform block of 2N×2N samples, inverse transforming the four transform blocks of N×N samples and modifying the respective reconstructed prediction error values if a first flag associated with the transform block of 2N×2N samples has a value indicating that the transform block of 2N×2N samples is split into the four transform blocks of N×N samples and if a second flag associated with the transform block of 2N×2N samples has a value indicating that transform coefficients are available for a 2N×2N transform block level.

In an embodiment, the device is configured to inverse transform a first transform block of samples having a respective transform coefficient to obtain a first residual block of samples having a respective reconstructed prediction error value. The device is also configured to inverse transform a second transform block of samples having a respective transform coefficient to obtain a second residual block of samples having a respective reconstructed prediction error value. The device is further configured to modify respective reconstructed prediction error values in a sub-portion of the second residual block. The device is additionally configured to add, sample by sample, the respective reconstructed prediction error values of the second residual block to the respective reconstructed prediction error values of the first residual block.

In a particular embodiment, the device is configured to zero the respective reconstructed prediction error values in the sub-portion of the second residual block.

In another particular embodiment, the device is configured to multiply each respective reconstructed prediction error value in the sub-portion of the second residual block with a respective weight.

In a further particular embodiment, the device is configured to identify the sub-portion of the second residual block based on a respective value of at least one flag associated with the second transform block.

In an embodiment, the device is configured to inverse transform the first transform block of samples having a respective zero-frequency or low frequency transform coefficient to obtain the first residual block. The device is also configured to inverse transform the second transform block of samples having a respective high frequency transform coefficient to obtain the second residual block.

In a particular embodiment, the device is configured to split the transform block into the first transform block and the second transform block by copying the respective zero-frequency and low frequency transform coefficients from the transform block into zero-frequency and low frequency sample positions in the first transform block. The device is also configured to set remaining sample positions in the first transform block to zero. The device is further configured to copy the respective high frequency transform coefficients from the transform block into high frequency sample positions in the second transform block and set remaining sample positions in the second transform block to zero.

Yet another aspect of the embodiments relates to a device for transform block decoding. The device is configured to inverse transform a transform block of samples having a respective transform coefficient to obtain a residual block of samples having a respective reconstructed prediction error value. The device is also configured to provide a transform skip block of samples having a respective prediction error value. The transform skip block has a smaller size in terms of number of samples as compared to the residual block. The device is further configured to modify, sample by sample, respective reconstructed prediction error values in a sub-portion of the residual block by respective prediction error values of the transform skip block.

In a particular embodiment, the device is configured to add, sample by sample, the respective prediction error values of the transform skip block to the respective reconstructed prediction error values of the sub-portion of the residual block.

In another particular embodiment, the device is configured to replace, sample by sample, the respective reconstructed prediction error values of the sub-portion of the residual block by the respective prediction error values of the transform skip block.

A further aspect of the embodiments defines a device for transform block encoding. The device is configured to transform a residual block of samples having a respective prediction error value into a transform block of samples having a respective transform coefficient. The device is also configured to provide information instructing a decoder to modify respective reconstructed prediction error values of samples in a sub-portion of a reconstructed version of the residual block obtained based on the transform block. The modification affects reconstructed prediction error values of samples in the sub-portion of the reconstructed version of the residual block but not reconstructed prediction error values of samples in a remaining portion of the reconstructed version of the residual block.

Yet another aspect of the embodiments defines a device for transform block encoding. The device is configured to transform a first residual block of samples having a respective prediction error value into a first transform block of samples having a respective transform coefficient. The device is also configured to transform a second residual block of samples having a respective prediction error value into a second transform block of samples having a respective transform coefficient. The device is further configured to provide information instructing a decoder to modify respective reconstructed prediction error values of samples in a sub-portion of a reconstructed version of the first residual block obtained based on the first transform block by respective reconstructed prediction error values of a reconstructed version of the second residual block obtained based on the second transform block. The modification affects reconstructed prediction error values of samples in the sub-portion of the reconstructed version of the first residual block but not reconstructed prediction error values of samples in a remaining portion of the reconstructed version of the first residual block.

In an embodiment, the second residual block has a smaller size in terms of number of samples as compared to the first residual block and the second residual block corresponds to a sub-portion of the first residual block. The modification comprises modifying, sample by sample, the respective reconstructed prediction error values of the sub-portion of the reconstructed version of the first residual block obtained based on the first transform block by respective reconstructed prediction error values of a reconstructed version of the second residual block obtained based on the second transform block.

In an embodiment, the device is configured to transform a residual block of 2N×2N samples having a respective prediction error value to obtain a transform block of 2N×2N samples having a respective transform coefficient. The device is also configured to transform at least one residual block of N×N samples having a respective prediction error value to obtain at least one transform block of N×N samples having a respective transform coefficient. Each residual block of the at least one residual block of N×N samples corresponds to a respective sub-portion of the residual block of 2N×2N samples. The modification comprises modifying, sample by sample and for each transform block of the at least one transform block of N×N samples, the respective reconstructed prediction error values of a respective sub-portion of a reconstructed version of the residual block of 2N×2N samples obtained based on the transform block of 2N×2N samples by respective reconstructed prediction error values of a reconstructed version of a residual block of N×N samples obtained based on the transform block of N×N samples.

In a particular embodiment, the device is configured to set at least one flag associated with the transform block of 2N×2N samples to a value indicating that the transform block of 2N×2N samples that transform coefficients are available for a 2N×2N transform block level.

In an embodiment, the device is configured to transform a residual block of 2N×2N samples having a respective prediction error value to obtain a transform block of 2N×2N samples having a respective transform coefficient. The device is also configured to transform four residual blocks of N×N samples having a respective prediction error value to obtain four transform blocks of N×N samples having a respective transform coefficient. Each residual block of the four residual blocks of N×N samples corresponds to a respective sub-portion of the residual block of 2N×2N samples. The modification preferably comprises modifying, sample by sample, the respective reconstructed prediction error values of a first sub-portion of a reconstructed version of the residual block of 2N×2N samples obtained based on the transform block of 2N×2N samples by respective reconstructed prediction error values of a reconstructed version of a first residual block of N×N samples obtained based on a first transform block of N×N samples of the four transform blocks of N×N samples. The modification also comprises modifying, sample by sample, the respective reconstructed prediction error values of a second sub-portion of the reconstructed version of the residual block of 2N×2N samples by respective reconstructed prediction error values of a reconstructed version of a second residual block of N×N samples obtained based on a second transform block of N×N samples of the four residual blocks of N×N samples. The modification further comprises modifying, sample by sample, the respective reconstructed prediction error values of a third sub-portion of the reconstructed version of the residual block of 2N×2N samples by respective reconstructed prediction error values of a reconstructed version of a third residual block of N×N samples obtained based on a third transform block of N×N samples of the four residual blocks of N×N samples. The modification additionally comprises modifying, sample by sample, the respective reconstructed prediction error values of a fourth sub-portion of the reconstructed version of the residual block of 2N×2N samples by respective reconstructed prediction error values of a reconstructed version of a fourth residual block of N×N samples obtained based on a fourth transform block of N×N samples of the four residual blocks of N×N samples.

In a particular embodiment, the device is configured to set a first flag associated with the transform block of 2N×2N samples to a value indicating that the transform block of 2N×2N samples is split into the four transform blocks of N×N samples. The device is also configured to set a second flag associated with the transform block of 2N×2N samples to a value indicating that transform coefficients are available for a 2N×2N transform block level.

In an embodiment, the device is configured to transform a first residual block of samples having a respective prediction error value into a first transform block of samples having a respective transform coefficient. The device is also configured to transform a second residual block of samples having a respective prediction error value into a second transform block of samples having a respective transform coefficient. The modification preferably comprises modifying respective reconstructed prediction error values in a sub-portion of a reconstructed version of the second residual block obtained based on the second transform block. The modification also comprises adding, sample by sample, the respective reconstructed prediction error values of the reconstructed version of the second residual block to the reconstructed respective prediction error values of the reconstructed version of the first residual block obtained based on the first transform block.

In a particular embodiment, the modification comprises zeroing the respective reconstructed prediction error values in the sub-portion of the reconstructed version of the second residual block.

In another particular embodiment, the modification comprises multiplying each respective reconstructed prediction error value in the sub-portion of the reconstructed version of the second residual block with a respective weight.

In a further particular embodiment, the device is configured to set at least one flag associated with the second transform block to a respective value indicating a position of the sub-portion in the reconstructed version of the second residual block.

In an embodiment, the device is configured to transform the first residual block into the first transform block of samples having a respective zero-frequency or low frequency transform coefficient. The device is also configured to transform the second residual block into the second transform block of samples having a respective high frequency transform coefficient to obtain the second residual block.

In an embodiment, the device is configured to provide information instructing the decoder to split the transform block into a first transform block of samples having a respective zero-frequency or low frequency transform coefficient and a second transform block of samples having a respective high frequency transform coefficient. The split preferably comprises copying respective zero-frequency and low frequency transform coefficients from the transform block into zero-frequency and low frequency sample positions in the first transform block and setting remaining sample positions in the first transform block to zero. The split also comprises copying respective high frequency transform coefficients from the transform block into high frequency sample positions in the second transform block and setting remaining sample positions in the second transform block to zero. The modification preferably comprises modifying respective prediction error value in a sub-portion of a reconstructed version of a second residual block of samples obtained based on the second transform block. The modification also comprises adding, sample by sample, the respective prediction error values of the reconstructed version of the second residual block to respective prediction error values of the reconstructed version of the first residual block obtained based on the first transform block.

A further aspect of the embodiments defines a device for transform block encoding. The device is configured to transform a residual block of samples having a respective prediction error value into a transform block of samples having a respective transform coefficient. The device is also configured to provide a transform skip block of samples having a respective prediction error value. The transform skip block has a smaller size in terms of number of samples as compared to the residual block in this embodiment. The device is further configured to provide information instructing a decoder to modify, sample by sample, respective reconstructed prediction error values of samples in a sub-portion of a reconstructed version of the residual block obtained based on the transform block by respective prediction error values of the transform skip block. The modification affects reconstructed prediction error values of samples in the sub-portion of the reconstructed version of the residual block but not reconstructed prediction error values of samples in a remaining portion of the reconstructed version of the residual block.

In an embodiment, the device is configured to quantize the transform coefficients of the transform block to obtain quantized transform coefficients. The device is also configured to encode the quantized transform coefficients to obtain encoded, quantized transform coefficients. The reconstructed version of the residual block is obtained based on the transform block by decoding the encoded, quantized transform coefficients to obtain a reconstructed version of the quantized transform coefficients. The reconstructed version of the quantized transform coefficients are then dequantized to obtain a reconstructed version of the transform coefficients. The reconstructed version of the transform coefficients is inverse transformed to obtain the reconstructed version of the residual block.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Figure 21:
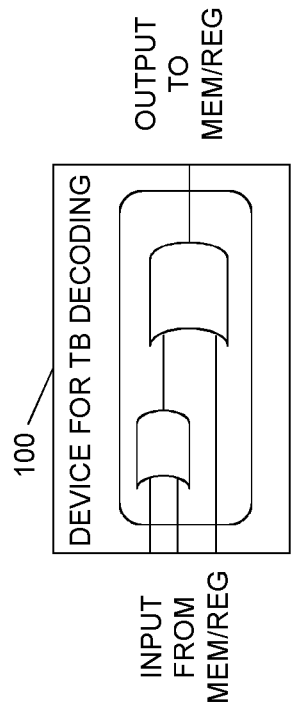
FIG. 21 is a schematic block diagram of a device for transform block decoding according to an embodiment.
Figure 22:
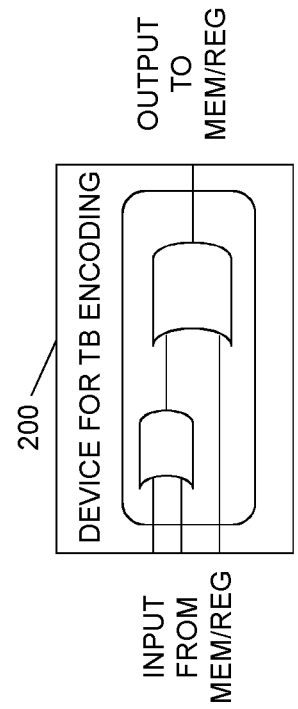
FIG. 22 is a schematic block diagram of a device for transform block encoding according to an embodiment.

FIG. 21 illustrates a particular hardware implementation of a device 100 for transform block decoding. FIG. 22 illustrates a corresponding hardware implementation of a device 200 for transform block encoding. Particular examples of suitable hardware circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device, unit, system or arrangement in which the proposed technology is implemented. It may also be possible to re-use existing software, e.g. by reprogramming of the existing software or by adding new software components.

In a particular example, a device 110 for transform block decoding, see FIG. 23, comprises a processor 111 and a memory 112 comprising instructions executable by the processor 111.

In an embodiment, the processor 111 is operative to inverse transform the first transform block and the second transform block. The processor 111 is also operative to modify the respective reconstructed prediction error values of samples in the sub-portion of the first residual block by the respective reconstructed prediction error values of the second residual block.

In another embodiment, the processor 111 is operative to inverse transform the transform block. The processor 111 is also operative to provide the transform skip block. The processor 111 is further operative to modify the respective reconstructed prediction error values of samples in the sub-portion of the residual block by the respective prediction error values of the transform skip block.

The device 110 optionally also comprises a receiver 113 and a transmitter 114. The receiver 113 and transmitter 114 could be implemented as a receiver and transmitter pair for wireless communication or as a common transceiver. Alternatively, they could be in the form of an input port and an output port for conducting wired communication.

The receiver 113 is preferably configured to receive encoded video data and in particular transform coefficients. The transmitter 114 is preferably configured to transmit decoded video data and in particular reconstructed prediction error values.

A device 210 for transform block encoding is shown in FIG. 24. The device 210 comprises a processor 211 and a memory 212 comprising instructions executable by the processor 211.

In an embodiment, the processor 211 is operative to operative to transform the first residual block and the second residual block into the first transform block and the second transform block. The processor 211 is also operative to provide information instructing the decoder to modify the respective reconstructed prediction error values of samples in the sub-portion of the reconstructed version of the first residual block by the respective reconstructed prediction error values of the reconstructed version of the second residual block.

In another embodiment, the processor 211 is operative to transform the residual block into the transform block. The processor 211 is also operative to provide the transform skip block. The processor 211 is further operative to provide the information instructing the decoder to modify the respective reconstructed prediction error values of samples in the sub-portion of the reconstructed version of the residual block obtained based on the transform block by the respective prediction error values of the transform skip block.

The device 120 optionally also comprises a receiver 213 and a transmitter 214. The receiver 213 and transmitter 214 could be implemented as a receiver and transmitter pair for wireless communication or as a common transceiver. Alternatively, they could be in the form of an input port and an output port for conducting wired communication.

The receiver 213 is preferably configured to receive video data and in particular prediction error values. The transmitter 214 is preferably configured to transmit encoded video data and in particular transform coefficients.

With reference to FIGS. 23 and 24, in a particular embodiment, the processor 111, 211 is operative, when executing the instructions stored in the memory 112, 212 to perform the above-described operations. The processor 111, 211 is thereby interconnected to the memory 112, 212 to enable normal software execution.

Figure 25:
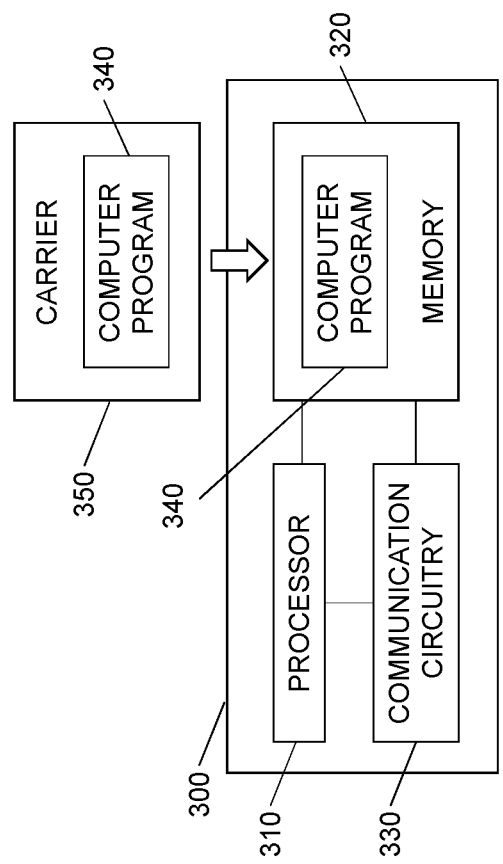
FIG. 25 schematically illustrates implementation of embodiments in the form of a computer program.

FIG. 25 is a schematic block diagram illustrating an example of a device 300 comprising a processor 310, an associated memory 320 and a communication circuitry 330.

In this particular example, at least some of the steps, functions, procedures, modules and/or blocks described herein are implemented in a computer program 340, which is loaded into the memory 320 for execution by processing circuitry including one or more processors 310. The processor 310 and memory 320 are interconnected to each other to enable normal software execution. A communication circuitry 330 is also interconnected to the processor 310 and/or the memory 320 to enable wireless or wired communication.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In an embodiment, the computer program 340 comprises instructions, which when executed by the processor 310, cause the processor 310 to inverse transform a first transform block of samples having a respective transform coefficient to obtain a first residual block of samples having a respective reconstructed prediction error value. The processor 310 is also caused to inverse transform a second transform block of samples having a respective transform coefficient to obtain a second residual block of samples having a respective reconstructed prediction error value. The processor 310 is further caused to modify respective reconstructed prediction error values of samples in a sub-portion of the first residual block by respective reconstructed prediction error values of the second residual block. The modification performed by the processor 310 affects reconstructed prediction error values of samples in the sub-portion of the first residual block but not reconstructed prediction error values of samples in a remaining portion of the first residual block.

In an embodiment, the computer program 340 comprises instructions, which when executed by the processor 310, cause the processor 310 to inverse transform a transform block of samples having a respective transform coefficient to obtain a residual block of samples having a respective reconstructed prediction error value. The processor 310 is also caused to provide a transform skip block of samples having a respective prediction error value. The transform skip block has a smaller size in terms of number of samples as compared to the residual block. The processor 310 is further caused to modify, sample by sample, respective reconstructed prediction error values of samples in a sub-portion of the residual block by respective prediction error values of the transform skip block. The modification performed by the processor 310 affects reconstructed prediction error values of samples in the sub-portion of the residual block but not reconstructed prediction error values of samples in a remaining portion of the residual block.

In a further embodiment, the computer program 340 comprises instructions, which when executed by the processor 310, cause the processor 310 to transform a first residual block of samples having a respective prediction error value into a first transform block of samples having a respective transform coefficient. The processor 310 is also caused to transform a second residual block of samples having a respective prediction error value into a second transform block of samples having a respective transform coefficient. The processor 310 is also caused to provide information instructing a decoder to modify respective reconstructed prediction error values of samples in a sub-portion of a reconstructed version of the first residual block obtained based on the first transform block by respective reconstructed prediction error values of a reconstructed version of the second residual block obtained based on the second transform block. The modification performed by the processor 310 affects reconstructed prediction error values of samples in the sub-portion of the reconstructed version of the first residual block but not reconstructed prediction error values of samples in a remaining portion of the reconstructed version of the first residual block.

In yet another embodiment, the computer program 340 comprises instructions, which when executed by the processor 310, cause the processor 310 to transform a residual block of samples having a respective prediction error value into a transform block of samples having a respective transform coefficient. The processor 310 is also caused to provide a transform skip block of samples having a respective prediction error value. The transform skip block has a smaller size in terms of number of samples as compared to the residual block. The processor 310 is further caused to provide information instructing a decoder to modify, sample by sample, respective reconstructed prediction error values of samples in a sub-portion of a reconstructed version of the residual block obtained based on the transform block by respective prediction error values of the transform skip block. The modification performed by the processor 310 affects reconstructed prediction error values of samples in the sub-portion of the reconstructed version of the residual block but not reconstructed prediction error values of samples in a remaining portion of the reconstructed version of the residual block.

The proposed technology also provides a carrier 350 comprising the computer program 340. The carrier 350 is one of an electronic signal, an optical signal, an electromagnetic signal, a magnetic signal, an electric signal, a radio signal, a microwave signal, or a computer-readable storage medium 350.

By way of example, the software or computer program 340 may be realized as a computer program product, which is normally carried or stored on a computer-readable medium 350, preferably non-volatile computer-readable storage medium 350. The computer-readable medium 350 may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device. The computer program 340 may thus be loaded into the operating memory 320 of a computer or equivalent processing device, represented by the device 300 in FIG. 27, for execution by the processor 310 thereof.

The flow diagram or diagrams presented herein may therefore be regarded as a computer flow diagram or diagrams, when performed by one or more processors. A corresponding device may be defined as a group of function modules, where each step performed by the processor corresponds to a function module. In this case, the function modules are implemented as a computer program running on the processor. Hence, the device may alternatively be defined as a group of function modules, where the function modules are implemented as a computer program running on at least one processor.

Figure 26:
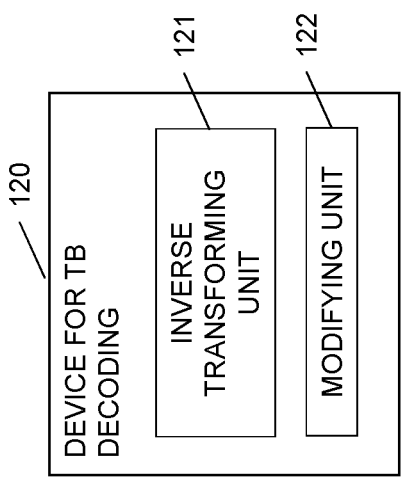
FIG. 26 is a schematic block diagram of a device for transform block decoding according to a further embodiment.

In an example as shown in FIG. 26, a device 120 for transform block decoding could be implemented with function modules. In such a case, the device 120 comprises an inverse transforming unit 121 for inverse transforming a first transform block of samples having a respective transform coefficient to obtain a first residual block of samples having a respective reconstructed prediction error value. The inverse transforming unit 121 is also for inverse transforming a second transform block of samples having a respective transform coefficient to obtain a second residual block of samples having a respective reconstructed prediction error value. The device 120 also comprises a modifying unit 122 for modifying respective reconstructed prediction error values of samples in a sub-portion of the first residual block of samples by respective reconstructed prediction error values of the second residual block. The modification performed by the modifying unit 122 affects reconstructed prediction error values of samples in the sub-portion of the first residual block but not reconstructed prediction error values of samples in a remaining portion of the first residual block.

In another example, the device 120 for transform block decoding comprises an inverse transforming unit 121 for inverse transforming a transform block of samples having a respective transform coefficient to obtain a residual block of samples having a respective reconstructed prediction error value. The device 120 also comprises a modifying unit 122 for modifying, sample by sample, respective reconstructed prediction error values of samples in a sub-portion of the residual block of samples by respective prediction error values of a transform skip block of samples having a respective prediction error value. The transform skip block has a smaller size in terms of number of samples as compared to the residual block. The modification performed by the modifying unit 122 affects reconstructed prediction error values of samples in the sub-portion of the residual block but not reconstructed prediction error values of samples in a remaining portion of the residual block.

Figure 27:
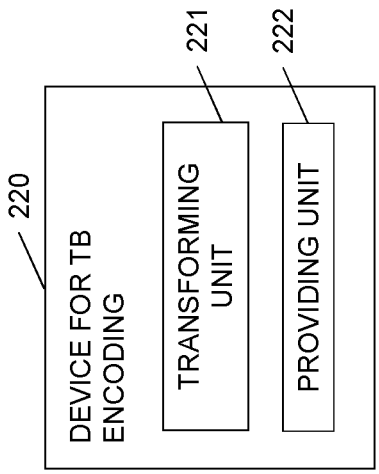
FIG. 27 is a schematic block diagram of a device for transform block encoding according to a further embodiment.

In a further example as shown in FIG. 27, a device 220 for transform block encoding could be implemented with function modules. The device 220 then preferably comprises a transforming unit 221 for transforming a first residual block of samples having a respective prediction error value into a first transform block of samples having a respective transform coefficient. The transforming unit 221 is also for transforming a second residual block of samples having a respective prediction error value into a second transform block of samples having a respective transform coefficient. The device 220 also comprises a providing unit 222 for providing information instructing a decoder to modify respective reconstructed prediction error values of samples in a sub-portion of a reconstructed version of the first residual block obtained based on the first transform block by respective reconstructed prediction error values of a reconstructed version of the second residual block obtained based on the second transform block. The modification affects reconstructed prediction error values of samples in the sub-portion of the reconstructed version of the first residual block but not reconstructed prediction error values of samples in a remaining portion of the reconstructed version of the first residual block.

In yet another example, a device 220 for transform block encoding comprises a transforming unit 221 for transforming a residual block of samples having a respective prediction error value into a transform block of samples having a respective transform coefficient. The device 220 also comprises a providing unit 222 for providing a transform skip block of samples having a respective prediction error value. The transform skip block has a smaller size in terms of number of samples as compared to the residual block. The providing unit 222 is also for providing information instructing a decoder to modify, sample by sample, respective reconstructed prediction error values of samples in a sub-portion of a reconstructed version of the residual block obtained based on the transform block by respective prediction error values of the transform skip block. The modification affects reconstructed prediction error values of samples in the sub-portion of the reconstructed version of the first residual block but not reconstructed prediction error values of samples in a remaining portion of the reconstructed version of the first residual block.

A further aspect of the embodiments relates to a decoder 130 as shown in FIG. 28. The decoder then comprises a device 100, 110, 120 for transform block decoding as described herein, and shown in FIGS. 21, 23 and 26.

The decoder 130 is preferably configured to decode encoded video frames or pictures of a video stream. The decoder 130 could be compliant with any video coding standard that uses transformation of prediction error values and inverse transformation of transformation coefficients in order to get decoded or reconstructed prediction error values. Non-limiting examples of such video coding standards are H.265 and H.266.

The embodiments also encompass, see FIG. 29, a user equipment 140 comprising a decoder 130, such as the decoder as shown in FIG. 28. The user equipment 140 could be any equipment or device having a decoder configured to decode a coded video bitstream to get decoded video data. The decoded video data is most often displayed on a screen of or connected to the user equipment 140.

The user equipment 140 could, for instance, be in the form of a mobile telephone, a smart phone, a computer, a laptop, a tablet, a set top box, a game console with video decoding capability, a transcoder, etc.

Figure 30:
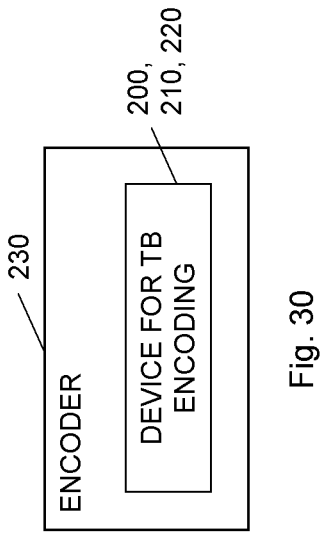
FIG. 30 is a schematic block diagram of an encoder according to an embodiment.

Yet another aspect of the embodiments, see FIG. 30, relates to an encoder 230 comprising a device 200, 210, 220 for transform block encoding as described herein, and shown in FIGS. 22, 24 and 27.

The encoder 230 is preferably configured to encode video frames or pictures of a video stream into a coded video bitstream. The encoder 230 could be compliant with any video coding standard that uses transformation of prediction error values and inverse transformation of transformation coefficients in order to get reconstructed prediction error values. Non-limiting examples of such video coding standards are H.265 and H.266.

The encoder 230 may be included in a device having capability of encoding video streams. Non-limiting examples of such devices include a video camera, a video creating device, a transcoder, etc.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method of transform block decoding, said method comprising:
    inverse transforming a first transform block of samples having respective transform coefficients to obtain a first residual block of samples having respective reconstructed prediction error values;
    inverse transforming a second transform block of samples having respective transform coefficients to obtain a second residual block of samples having respective reconstructed prediction error values, wherein said second residual block has a smaller size in terms of number of samples as compared to said first residual block and said second residual block corresponds to a sub-portion of said first residual block; and
    modifying respective reconstructed prediction error values of samples in the sub-portion of said first residual block by respective reconstructed prediction error values of said second residual block, wherein modifying said respective reconstructed prediction error values affects reconstructed prediction error values of samples in said sub-portion of said first residual block but not reconstructed prediction error values of samples in a remaining portion of said first residual block.

2. The method according to claim 1, wherein modifying said respective reconstructed prediction error values comprises modifying, sample by sample, said respective reconstructed prediction error values of said sub-portion of said first residual block by said respective reconstructed prediction error values of said second residual block.

3. The method according to claim 2, wherein modifying said respective reconstructed prediction error values comprises adding, sample by sample, said reconstructed respective prediction error values of said second residual block to said respective reconstructed prediction error values of said sub-portion of said first residual block.

4. The method according to claim 2, wherein modifying said respective reconstructed prediction error values comprises replacing, sample by sample, said respective reconstructed prediction error values of said sub-portion of said first residual block by said respective reconstructed prediction error values of said second residual block.

5. The method according to claim 1, wherein modifying said respective reconstructed prediction error values comprises:
    modifying respective reconstructed prediction error values in a sub-portion of said second residual block; and
    adding, sample by sample, said respective reconstructed prediction error values of said second residual block to said respective reconstructed prediction error values of said first residual block.

6. The method according to claim 5, wherein modifying said respective reconstructed prediction error values comprises zeroing said respective reconstructed prediction error values in said sub-portion of said second residual block.

7. The method according to claim 5, wherein modifying said respective reconstructed prediction error values comprises multiplying each respective reconstructed prediction error value in said sub-portion of said second residual block with a respective weight.

8. The method according to claim 5, wherein:
    inverse transforming said first transform block comprises inverse transforming said first transform block of samples having respective zero-frequency or low frequency transform coefficients to obtain said first residual block; and
    inverse transforming said second transform block comprises inverse transforming said second transform block of samples having respective high frequency transform coefficients to obtain said second residual block.

9. The method according to claim 8, further comprising splitting a transform block of samples having respective transform coefficients into said first transform block and said second transform block by:
    copying said respective zero-frequency and low frequency transform coefficients from said transform block into zero-frequency and low frequency sample positions in said first transform block;
    setting remaining sample positions in said first transform block to zero;

copying said respective high frequency transform coefficients from said transform block into high frequency sample positions in said second transform block; and setting remaining sample positions in said second transform block to zero.

10. A method of transform block decoding, said method comprising:

inverse transforming a transform block of samples having respective transform coefficients to obtain a residual block of samples having respective reconstructed prediction error values;

providing a transform skip block of samples having respective prediction error values, said transform skip block corresponding to a sub-portion of the residual block and having a smaller size in terms of number of samples as compared to said residual block; and modifying, sample by sample, respective reconstructed prediction error values of samples in the sub-portion of said residual block by said respective prediction error values of said transform skip block, wherein modifying said respective reconstructed prediction error values affects reconstructed prediction error values of samples in said sub-portion of said residual block but not reconstructed prediction error values of samples in a remaining portion of said residual block.

11. A method of transform block encoding comprising:

transforming a first residual block of samples having respective prediction error values into a first transform block of samples having respective transform coefficients;

transforming a second residual block of samples having respective prediction error values into a second transform block of samples having respective transform coefficients, wherein said second residual block has a smaller size in terms of number of samples as compared to said first residual block and said second residual block corresponds to a sub-portion of said first residual block; and providing information instructing a decoder to modify respective reconstructed prediction error values of samples in a same sub-portion of a reconstructed version of said first residual block obtained based on said first transform block by respective reconstructed prediction error values of a reconstructed version of said second residual block obtained based on said second transform block, wherein modifying said respective reconstructed prediction error values affects reconstructed prediction error values of samples in said sub-portion of said reconstructed version of said first residual block but not reconstructed prediction error values of samples in a remaining portion of said reconstructed version of said first residual block.

12. The method according to claim 11, wherein modifying said respective reconstructed prediction error values comprises modifying, sample by sample, said respective reconstructed prediction error values of said sub-portion of said reconstructed version of said first residual block obtained based on said first transform block by said respective reconstructed prediction error values of said reconstructed version of said second residual block obtained based on said second transform block.

13. The method according to claim 11, wherein modifying said respective prediction error values comprises:

modifying respective reconstructed prediction error values in a sub-portion of a reconstructed version of said second residual block obtained based on said second transform block; and adding, sample by sample, said respective reconstructed prediction error values of said reconstructed version of said second residual block to said respective reconstructed prediction error values of said reconstructed version of said first residual block obtained based on said first transform block.

14. The method according to claim 13, wherein:

transforming said first residual block comprises transforming said first residual block into said first transform block of samples having respective zero-frequency or low frequency transform coefficients; and transforming said second residual block comprises transforming said second residual block into said second transform block of samples having respective high frequency transform coefficients.

15. The method according to claim 11, wherein providing said information comprises providing information instructing said decoder to split a transform block of samples having respective transform coefficients into said first transform block of samples having respective zero-frequency or low frequency transform coefficients and said second transform block of samples having respective high frequency transform coefficients by:

copying respective zero-frequency and low frequency transform coefficients from said transform block into zero-frequency and low frequency sample positions in said first transform block;

setting remaining sample positions in said first transform block to zero;

copying respective high frequency transform coefficients from said transform block into high frequency sample positions in said second transform block; and setting remaining sample positions in said second transform block to zero, wherein modifying said respective prediction error values comprises:

modifying respective reconstructed prediction error values in a sub-portion of a reconstructed version of a second residual block of samples obtained based on said second transform block; and adding, sample by sample, said respective reconstructed prediction error values of said reconstructed version of said second residual block to respective reconstructed prediction error values of said reconstructed version of said first residual block obtained based on said first transform block.

16. A method of transform block encoding comprising:

transforming a residual block of samples having respective prediction error values into a transform block of samples having respective transform coefficients; and providing a transform skip block of samples having respective prediction error values, said transform skip block corresponding to a sub-portion of the residual block and having a smaller size in terms of number of samples as compared to said residual block; and providing information instructing a decoder to modify, sample by sample, respective reconstructed prediction error values of samples in a same sub-portion of a reconstructed version of said residual block obtained based on said transform block by respective prediction error values of said transform skip block, wherein modifying said respective reconstructed prediction error values affects reconstructed prediction error values of samples in said sub-portion of said reconstructed version of said residual block but not reconstructed prediction error values of samples in a remaining portion of said reconstructed version of said residual block.

17. A device for transform block decoding, wherein:
said device is configured to inverse transform a first transform block of samples having respective transform coefficients to obtain a first residual block of samples having respective reconstructed prediction error values;
said device is configured to inverse transform a second transform block of samples having respective transform coefficients to obtain a second residual block of samples having respective reconstructed prediction error values, wherein said second residual block has a smaller size in terms of number of samples as compared to said first residual block and said second residual block corresponds to a sub-portion of said first residual block; and
said device is configured to modify respective reconstructed prediction error values of samples in the sub-portion of said first residual block by respective reconstructed prediction error values of said second residual block, wherein the modification performed by said device affects reconstructed prediction error values of samples in said sub-portion of said first residual block but not reconstructed prediction error values of samples in a remaining portion of said first residual block.

18. The device according to claim 17, wherein said device is configured to modify, sample by sample, said respective reconstructed prediction error values of said sub-portion of said first residual block by said respective reconstructed prediction error values of said second residual block.

19. The device according to claim 18, wherein said device is configured to add, sample by sample, said respective reconstructed prediction error values of said second residual block to said respective reconstructed prediction error values of said sub-portion of said first residual block.

20. The device according to claim 18, wherein said device is configured to replace, sample by sample, said respective reconstructed prediction error values of said sub-portion of said first residual block by said respective reconstructed prediction error values of said second residual block.

21. The device according to claim 17, wherein:
said device is configured to modify respective reconstructed prediction error values in a sub-portion of said second residual block; and
said device is configured to add, sample by sample, said respective reconstructed prediction error values of said second residual block to said respective reconstructed prediction error values of said first residual block.

22. The device according to claim 21, wherein:
said device is configured to inverse transform said first transform block of samples having respective zero-frequency or low frequency transform coefficients to obtain said first residual block; and
said device is configured to inverse transform said second transform block of samples having respective high frequency transform coefficients to obtain said second residual block.

23. The device according to claim 22, wherein said device is configured to split a transform block of samples having respective transform coefficients into said first transform block and said second transform block by:
copying said respective zero-frequency and low frequency transform coefficients from said transform block into zero-frequency and low frequency sample positions in said first transform block;
setting remaining sample positions in said first transform block to zero;
copying said respective high frequency transform coefficients from said transform block into high frequency sample positions in said second transform block; and
setting remaining sample positions in said second transform block to zero.

24. The device according to claim 17, comprising:
a processor; and
a memory comprising instructions executable by said processor, wherein
said processor is operative to inverse transform said first transform block and said second transform block; and
said processor is operative to modify said respective reconstructed prediction error values of samples in said sub-portion of said first residual block by said respective reconstructed prediction error values of said second residual block.

25. A device for transform block decoding comprising:
an inverse transforming unit for inverse transforming a first transform block of samples having respective transform coefficients to obtain a first residual block of samples having respective reconstructed prediction error values and inverse transforming a second transform block of samples having respective transform coefficients to obtain a second residual block of samples having respective reconstructed prediction error values, wherein said second residual block has a smaller size in terms of number of samples as compared to said first residual block and said second residual block corresponds to a sub-portion of said first residual block; and
a modifying unit for modifying respective reconstructed prediction error values of samples in the sub-portion of said first residual block by respective reconstructed prediction error values of said second residual block, wherein the modification performed by said modifying unit affects reconstructed prediction error values of samples in said sub-portion of said first residual block but not reconstructed prediction error values of samples in a remaining portion of said first residual block.

26. A device for transform block decoding, wherein:
said device is configured to inverse transform a transform block of samples having respective transform coefficients to obtain a residual block of samples having respective reconstructed prediction error values;
said device is configured to provide a transform skip block of samples having respective prediction error values, said transform skip block corresponding to a sub-portion of the residual block and having a smaller size in terms of number of samples as compared to said residual block; and
said device is configured to modify, sample by sample, respective reconstructed prediction error values in the sub-portion of said residual block by said respective prediction error values of said transform skip block, wherein the modification performed by said device affects reconstructed prediction error values of samples in said sub-portion of said residual block but not reconstructed prediction error values of samples in a remaining portion of said residual block.

27. The device according to claim 26, comprising:
a processor; and
a memory comprising instructions executable by said processor, wherein:
said processor is operative to inverse transform said transform block;
said processor is operative to provide said transform skip block; and said processor is operative to modify said respective reconstructed prediction error values of samples in said sub-portion of said residual block by said respective prediction error values of said transform skip block.

28. A device for transform block decoding comprising:
an inverse transforming unit for inverse transforming a transform block of samples having respective transform coefficients to obtain a residual block of samples having respective reconstructed prediction error values; and
a modifying unit for modifying, sample by sample, respective reconstructed prediction error values in a sub-portion of said residual block by respective prediction error values of a transform skip block of samples having respective prediction error values, said transform skip block corresponding to said sub-portion of said residual block and having a smaller size in terms of number of samples as compared to said residual block, wherein the modification performed by said modifying unit affects reconstructed prediction error values of samples in said sub-portion of said residual block but not reconstructed prediction error values of samples in a remaining portion of said residual block.

29. A decoder comprising a device for transform block decoding, wherein:
said device is configured to inverse transform a first transform block of samples having respective transform coefficients to obtain a first residual block of samples having respective reconstructed prediction error values;
said device is configured to inverse transform a second transform block of samples having respective transform coefficients to obtain a second residual block of samples having respective reconstructed prediction error values, wherein said second residual block has a smaller size in terms of number of samples as compared to said first residual block and said second residual block corresponds to a sub-portion of said first residual block; and
said device is configured to modify respective reconstructed prediction error values of samples in the sub-portion of said first residual block by respective reconstructed prediction error values of said second residual block, wherein the modification performed by said device affects reconstructed prediction error values of samples in said sub-portion of said first residual block but not reconstructed prediction error values of samples in a remaining portion of said first residual block.

30. A user equipment comprising a decoder for transform block decoding, wherein:
said decoder is configured to inverse transform a first transform block of samples having respective transform coefficients to obtain a first residual block of samples having respective reconstructed prediction error values;
said decoder is configured to inverse transform a second transform block of samples having respective transform coefficients to obtain a second residual block of samples having respective reconstructed prediction error values, wherein said second residual block has a smaller size in terms of number of samples as compared to said first residual block and said second residual block corresponds to a sub-portion of said first residual block; and
said decoder is configured to modify respective reconstructed prediction error values of samples in the sub-portion of said first residual block by respective reconstructed prediction error values of said second residual block, wherein the modification performed by said decoder affects reconstructed prediction error values of samples in said sub-portion of said first residual block but not reconstructed prediction error values of samples in a remaining portion of said first residual block.

31. A device for transform block encoding,
said device is configured to transform a first residual block of samples having respective prediction error values into a first transform block of samples having respective transform coefficients;
said device is configured to transform a second residual block of samples having respective prediction error values into a second transform block of samples having respective transform coefficients, wherein said second residual block has a smaller size in terms of number of samples as compared to said first residual block and said second residual block corresponds to a sub-portion of said first residual block; and
said device is configured to provide information instructing a decoder to modify respective reconstructed prediction error values of samples in a same sub-portion of a reconstructed version of said first residual block obtained based on said first transform block by respective reconstructed prediction error values of a reconstructed version of said second residual block obtained based on said second transform block, wherein modifying said respective reconstructed prediction error values affects reconstructed prediction error values of samples in said sub-portion of said reconstructed version of said first residual block but not reconstructed prediction error values of samples in a remaining portion of said reconstructed version of said first residual block.

32. The device according to claim 31, wherein modifying said respective reconstructed prediction error values comprises modifying, sample by sample, said respective reconstructed prediction error values of said sub-portion of said reconstructed version of said first residual block by respective reconstructed prediction error values of a reconstructed version of said second residual block.

33. The device according to claim 31, wherein modifying said respective prediction error values comprises:
modifying respective reconstructed prediction error values in a sub-portion of a reconstructed version of said second residual block obtained based on said second transform block; and
adding, sample by sample, said respective reconstructed prediction error values of said reconstructed version of said second residual block to said reconstructed respective prediction error values of said reconstructed version of said first residual block obtained based on said first transform block.

34. The device according to claim 33, wherein:
said device is configured to transform said first residual block into said first transform block of samples having a respective zero-frequency or low frequency transform coefficient; and
said device is configured to transform said second residual block into said second transform block of samples having a respective high frequency transform coefficient to obtain said second residual block.

35. The device according to claim 31, wherein said device is configured to provide information instructing said decoder to split a transform block of samples having respective transform coefficients into said first transform block of samples having respective zero-frequency or low frequency transform coefficients and said second transform block of samples having respective high frequency transform coefficients by:

copying respective zero-frequency and low frequency transform coefficients from said transform block into zero-frequency and low frequency sample positions in said first transform block;

setting remaining sample positions in said first transform block to zero;

copying respective high frequency transform coefficients from said transform block into high frequency sample positions in said second transform block; and setting remaining sample positions in said second transform block to zero, wherein modifying said respective prediction error values comprises:

modifying respective prediction error value in a sub-portion of a reconstructed version of a second residual block of samples obtained based on said second transform block; and adding, sample by sample, said respective prediction error values of said reconstructed version of said second residual block to respective prediction error values of said reconstructed version of said first residual block obtained based on said first transform block.

36. The device according to claim 31, comprising:
a processor; and
a memory comprising instructions executable by said processor, wherein
said processor is operative to transform said first residual block and said second residual block into said first transform block and said second transform block; and
said processor is operative to provide said information instructing said decoder to modify said respective reconstructed prediction error values of samples in said sub-portion of said reconstructed version of said first residual block by said respective reconstructed prediction error values of said reconstructed version of said second residual block.

37. A device for transform block encoding comprising:
a transforming unit for transforming a first residual block of samples having respective prediction error values into a first transform block of samples having respective transform coefficients and transforming a second residual block of samples having respective prediction error values into a second transform block of samples having respective transform coefficients, wherein said second residual block has a smaller size in terms of number of samples as compared to said first residual block and said second residual block corresponds to a sub-portion of said first residual block; and
a providing unit for providing information instructing a decoder to modify respective reconstructed prediction error values of samples in a same sub-portion of a reconstructed version of said first residual block obtained based on said first transform block by respective reconstructed prediction error values of a reconstructed version of said second residual block obtained based on said second transform block, wherein modifying said respective reconstructed prediction error values affects reconstructed prediction error values of samples in said sub-portion of said reconstructed version of said first residual block but not reconstructed prediction error values of samples in a remaining portion of said reconstructed version of said first residual block.

38. A device for transform block encoding:
said device is configured to transform a residual block of samples having respective prediction error values into a transform block of samples having respective transform coefficients;
said device is configured to provide a transform skip block of samples having respective prediction error values, said transform skip block corresponding to a sub-portion of the residual block and having a smaller size in terms of number of samples as compared to said residual block; and
said device is configured to provide information instructing a decoder to modify, sample by sample, respective reconstructed prediction error values of samples in a same sub-portion of a reconstructed version of said residual block obtained based on said transform block by said respective prediction error values of said transform skip block, wherein modifying said respective reconstructed prediction error values affects reconstructed prediction error values of samples in said sub-portion of said reconstructed version of said residual block but not reconstructed prediction error values of samples in a remaining portion of said reconstructed version of said residual block.

39. The device according to claim 38, comprising:
a processor; and
a memory comprising instructions executable by said processor, wherein
said processor is operative to transform said residual block into said transform block;
said processor is operative to provide said transform skip block; and
said processor is operative to provide said information instructing said decoder to modify, sample by sample, said respective reconstructed prediction error values of samples in said sub-portion of said reconstructed version of said residual block obtained based on said transform block by said respective prediction error values of said transform skip block.

40. A device for transform block encoding comprising:
a transforming unit for transforming a residual block of samples having respective prediction error values into a transform block of samples having respective transform coefficients; and
a providing unit for providing a transform skip block of samples having respective prediction error values, said transform skip block corresponding to a sub-portion of the residual block and having a smaller size in terms of number of samples as compared to said residual block and providing information instructing a decoder to modify, sample by sample, respective reconstructed prediction error values of samples in a same sub-portion of a reconstructed version of said residual block obtained based on said transform block by said respective prediction error values of said transform skip block, wherein modifying said respective reconstructed prediction error values affects reconstructed prediction error values of samples in said sub-portion of said reconstructed version of said residual block but not reconstructed prediction error values of samples in a remaining portion of said reconstructed version of said residual block.

41. An encoder comprising a device for transform block encoding wherein:
said device is configured to transform a first residual block of samples having respective prediction error values into a first transform block of samples having respective transform coefficients;

said device is configured to transform a second residual block of samples having respective prediction error values into a second transform block of samples having respective transform coefficients, wherein said second residual block has a smaller size in terms of number of samples as compared to said first residual block and said second residual block corresponds to a sub-portion of said first residual block; and said device is configured to provide information instructing a decoder to modify respective reconstructed prediction error values of samples in a same sub-portion of a reconstructed version of said first residual block obtained based on said first transform block by respective reconstructed prediction error values of a reconstructed version of said second residual block obtained based on said second transform block, wherein modifying said respective reconstructed prediction error values affects reconstructed prediction error values of samples in said sub-portion of said reconstructed version of said first residual block but not reconstructed prediction error values of samples in a remaining portion of said reconstructed version of said first residual block.

42. A non-transitory computer-readable medium storing a computer program comprising instructions that, when executed by a processor, cause said processor to:

inverse transform a first transform block of samples having respective transform coefficients to obtain a first residual block of samples having respective reconstructed prediction error values;

inverse transform a second transform block of samples having respective transform coefficients to obtain a second residual block of samples having respective reconstructed prediction error values, wherein said second residual block has a smaller size in terms of number of samples as compared to said first residual block and said second residual block corresponds to a sub-portion of said first residual block; and modify respective reconstructed prediction error values of samples in the sub-portion of said first residual block by respective reconstructed prediction error values of said second residual block, wherein the modification performed by said processor affects reconstructed prediction error values of samples in said sub-portion of said first residual block but not reconstructed prediction error values of samples in a remaining portion of said first residual block.

43. A non-transitory computer-readable medium storing a computer program comprising instructions that, when executed by a processor, cause said processor to:

transform a transform block of samples having respective transform coefficients to obtain a residual block of samples having respective reconstructed prediction error values;

provide a transform skip block of samples having respective prediction error values, said transform skip block corresponding to a sub-portion of the residual block and having a smaller size in terms of number of samples as compared to said residual block; and modify, sample by sample, said respective reconstructed prediction error values of said sub-portion of said residual block by said respective prediction error values of said transform skip block, wherein the modification performed by said processor affects reconstructed prediction error values of samples in said sub-portion of said residual block but not reconstructed prediction error values of samples in a remaining portion of said residual block.

44. A non-transitory computer-readable medium storing a computer program comprising instructions that, when executed by a processor, cause said processor to:

transform a first residual block of samples having respective prediction error values into a first transform block of samples having respective transform coefficients;

transform a second residual block of samples having respective prediction error values into a second transform block of samples having respective transform coefficients, wherein said second residual block has a smaller size in terms of number of samples as compared to said first residual block and said second residual block corresponds to a sub-portion of said first residual block; and provide information instructing a decoder to modify respective reconstructed prediction error values of samples in a same sub-portion of a reconstructed version of said first residual block obtained based on said first transform block by respective reconstructed prediction error values of a reconstructed version of said second residual block obtained based on said second transform block, wherein modifying said respective reconstructed prediction error values affects reconstructed prediction error values of samples in said sub-portion of said reconstructed version of said first residual block but not reconstructed prediction error values of samples in a remaining portion of said reconstructed version of said first residual block.

45. A non-transitory computer-readable medium storing a computer program comprising instructions that, when executed by a processor, cause said processor to:

transform a residual block of samples having respective prediction error values into a transform block of samples having respective transform coefficients;

provide a transform skip block of samples having respective prediction error values, said transform skip block corresponding to a portion of the residual block and having a smaller size in terms of number of samples as compared to said residual block; and provide information instructing a decoder to modify, sample by sample, respective reconstructed prediction error values of samples in a same sub-portion of a reconstructed version of said residual block obtained based on said transform block by said respective prediction error values of said transform skip block, wherein modifying said respective reconstructed prediction error values affects reconstructed prediction error values of samples in said sub-portion of said reconstructed version of said residual block but not reconstructed prediction error values of samples in a remaining portion of said reconstructed version of said residual block.

* * * * *

UNITED STATES PATENT AND TRADEMARK OFFICE
CERTIFICATE OF CORRECTION

PATENT NO. : 10,080,038 B2  
APPLICATION NO. : 14/779262  
DATED : September 18, 2018  
INVENTOR(S) : Andersson et al.

Page 1 of 1

It is certified that error appears in the above-identified patent and that said Letters Patent is hereby corrected as shown below:

In the Drawings

In Fig. 13, Sheet 4 of 12, for Step "S40", Line 1, delete "1TB" and insert -- 1ST TB --, therefor.

In Fig. 9, Sheet 4 of 12, for Step "S31", Line 1, delete "1RB" and insert -- 1ST RB --, therefor.

In Fig. 24, Sheet 9 of 12, delete Tag "123" and insert Tag -- 213 --, therefor.

In the Specification

In Column 8, Line 10, delete "embodiment; and" and insert -- embodiment; --, therefor.

In Column 8, Line 12, delete "embodiment." and insert -- embodiment; --, therefor.

In Column 8, Line 14, delete "values." and insert -- values; and --, therefor.

In Column 25, Line 50, delete "of it" and insert -- if it --, therefor.

In Column 26, Line 13, delete "then used" and insert -- then be used --, therefor.

Signed and Sealed this  
Second Day of April, 2019

Andrei Iancu  
*Director of the United States Patent and Trademark Office*